US011824911B2

(12) United States Patent
You et al.

(10) Patent No.: US 11,824,911 B2
(45) Date of Patent: Nov. 21, 2023

(54) FLEXIBLE UPSTREAM/DOWNSTREAM SUPPORT FOR NETWORK-BASED MEDIA PROCESSING PIPELINES

(71) Applicant: Nokia Technologies Oy, Espoo (FI)

(72) Inventors: Yu You, Kangasala (FI); Sujeet Shyamsundar Mate, Tampere (FI); Kashyap Kammachi Sreedhar, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/567,444

(22) Filed: Jan. 3, 2022

(65) Prior Publication Data

US 2022/0217195 A1    Jul. 7, 2022

Related U.S. Application Data

(60) Provisional application No. 63/133,611, filed on Jan. 4, 2021.

(51) Int. Cl.
*H04L 65/65* (2022.01)
*H04L 65/70* (2022.01)
*H04L 65/75* (2022.01)

(52) U.S. Cl.
CPC .............. *H04L 65/65* (2022.05); *H04L 65/70* (2022.05); *H04L 65/75* (2022.05)

(58) Field of Classification Search
CPC .......... H04L 65/65; H04L 65/70; H04L 65/75
USPC .................................................. 709/231, 237
See application file for complete search history.

(56) References Cited

U.S. PATENT DOCUMENTS

| | | | |
|---|---|---|---|
| 2012/0110201 A1* | 5/2012 | Furbeck | G06F 16/44 709/231 |
| 2015/0264096 A1* | 9/2015 | Swaminathan | H04N 21/643 709/219 |
| 2018/0198871 A1* | 7/2018 | Walker | H04L 12/66 |
| 2019/0028691 A1* | 1/2019 | Hinds | H04N 21/4518 |

(Continued)

FOREIGN PATENT DOCUMENTS

WO    WO-2020144396 A1    7/2020

OTHER PUBLICATIONS

3rd Generation Partnership Project; Technical Specification Group Services and System Aspects; "Guidelines on the Framework for Live Uplink Streaming (FLUS)"; (Release 17). 3GPP TR 26.939 V17.0.0 (Sep. 2021).

(Continued)

Primary Examiner — Tan Doan
(74) Attorney, Agent, or Firm — Joseph C. Drish; Harrington & Smith

(57) ABSTRACT

An apparatus includes circuitry configured to: process media, the processing having an input and an output; determine a value of a mode to process the data, the value of the mode set to either push or pull; wherein the mode is added to an input descriptor or an output descriptor, and the mode functions with a protocol together in the input descriptor and the output descriptor; determine, for the input, when the value of the mode is set to push, that the data is pushed to the input, otherwise when the value of the mode is set to pull, that the data is pulled with the input; and determine, for the output, when the value of the mode is set to push, that the data is pushed from the output, otherwise when the value of the mode is set to pull, that the data is pulled from the output.

30 Claims, 17 Drawing Sheets

(56) References Cited

U.S. PATENT DOCUMENTS

2021/0096922 A1* 4/2021 Sodagar ............... G06F 9/5016
2021/0096925 A1* 4/2021 Sodagar ............... G06F 9/5072

OTHER PUBLICATIONS

Universal Mobile Telecommunications System (UMTS); LTE; 5G; "Uplink Streaming" (3GPP TS 26.238 version 16.6.2 Release 16) ETSI TS 126.238 V.16.6.2 (Nov. 2020).
Information Technology—Coded Representation of Immersive Media—Part—Network Based Media Processing w18236. MPEG Document Management System [online], Jan. 18, 2019.
FS_FLUS_NBMP: Permanent Document v0.5.1.3GPP [online], Nov. 19, 2020.
$3^{rd}$ Generation Partnership Project; Technical Specification Group Services and System Aspects; 5G Media Streaming 95GMS); General Description and Architecture (Release 16). 3GPP Online Dec. 23, 2020.
$3^{rd}$ Generation Partnership Project; Technical Specification Group Services and System Aspects; Guidelines on the Framework for Live Uplink Streaming (FLUS); (Release 16). 3GPP Online Mar. 31, 2020.
$3^{rd}$ Generation Partnership Project; Technical Specification Group Services and System Aspects; 5G; 5G Media Streaming (5GMS); Protocols (3GPP TS 26.512 version 16.0.0 Release 16) Dec. 23, 2020.
Information Technology—Dynamic Adaptive Streaming over HTTP (DASH)—Part 1: Media Presentation Description and Segment Formats W12166. MPEG [online], Sep. 6, 2011.

* cited by examiner

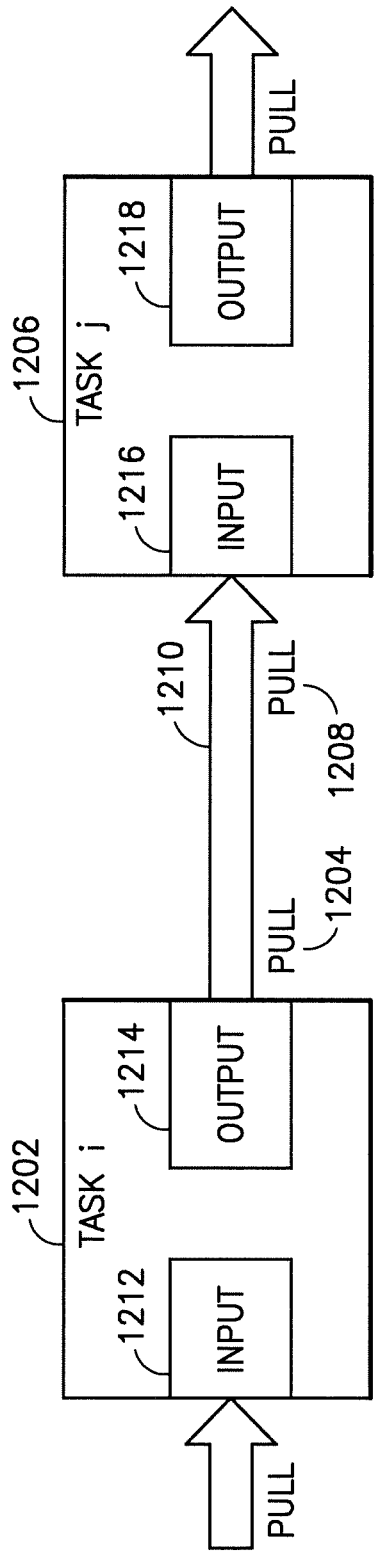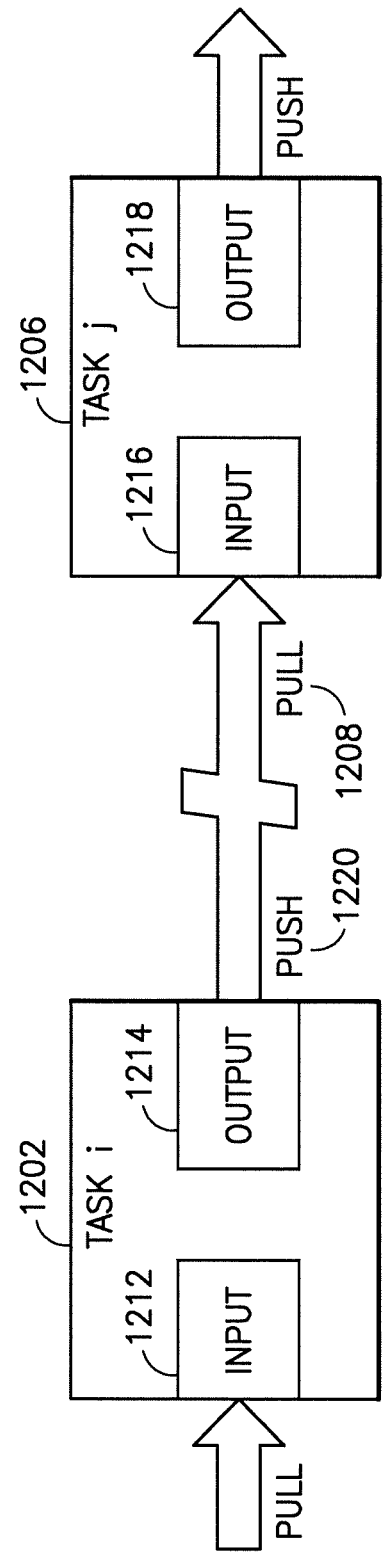

US 11,824,911 B2

FLEXIBLE UPSTREAM/DOWNSTREAM SUPPORT FOR NETWORK-BASED MEDIA PROCESSING PIPELINES

RELATED APPLICATION

This application claims priority to U.S. Provisional Application No. 63/133,611, filed Jan. 4, 2021, which is hereby incorporated by reference in its entirety.

TECHNICAL FIELD

The examples and non-limiting embodiments relate generally to transmission of media, and more particularly, to flexible upstream/downstream support for network-based media processing pipelines.

BACKGROUND

It is known to perform media streaming between a media source and a media receiver, such that data is delivered as push (as in the case of RTSP/RTP) or pull (as in the case of DASH/HLS/etc.). The term streaming is commonly used for both, push as well as pull delivery approaches.

SUMMARY

In an aspect, an apparatus includes at least one processor; and at least one memory including computer program code; wherein the at least one memory and the computer program code are configured to, with the at least one processor, cause the apparatus at least to: process media comprising data over a network, the processing having an input and an output; determine a value of a mode parameter to process the data, the value of the mode parameter set to either push or pull; wherein the mode parameter is added to an input descriptor or an output descriptor, and the mode parameter functions with a protocol parameter together in the input descriptor and the output descriptor; determine, for the input, when the value of the mode parameter is set to push, that the data is pushed to the input, otherwise when the value of the mode parameter is set to pull, that the data is pulled with the input; and determine, for the output, when the value of the mode parameter is set to push, that the data is pushed from the output, otherwise when the value of the mode parameter is set to pull, that the data is pulled from the output.

In an aspect, an apparatus includes at least one processor; and at least one memory including computer program code; wherein the at least one memory and the computer program code are configured to, with the at least one processor, cause the apparatus at least to: define, with network based media processing, an input descriptor and an output descriptor; wherein the input descriptor and the output descriptor are used for ingesting or egesting media and metadata into network based media processing workflow pipelines; wherein the input descriptor and the output descriptor are used for delivering outcome data from the pipelines to network based media processing media sink targets and internal inputs and outputs between upstream and downstream tasks; and process media comprising data over a network, using at least the input descriptor and the output descriptor.

In an aspect, an apparatus includes at least one processor; and at least one memory including computer program code; wherein the at least one memory and the computer program code are configured to, with the at least one processor, cause the apparatus at least to: process video on demand data for a first task in a push mode, wherein the first task is in an idle or running state; and process the video on demand data for a second task in a pull mode, wherein the second task is in an idle or running state.

BRIEF DESCRIPTION OF THE DRAWINGS

The foregoing aspects and other features are explained in the following description, taken in connection with the accompanying drawings, wherein:

FIG. 12A illustrates inter-working with compatible modes.

FIG. 12B illustrates inter-working with different modes.

DETAILED DESCRIPTION OF EXAMPLE EMBODIMENTS

Figure 1:
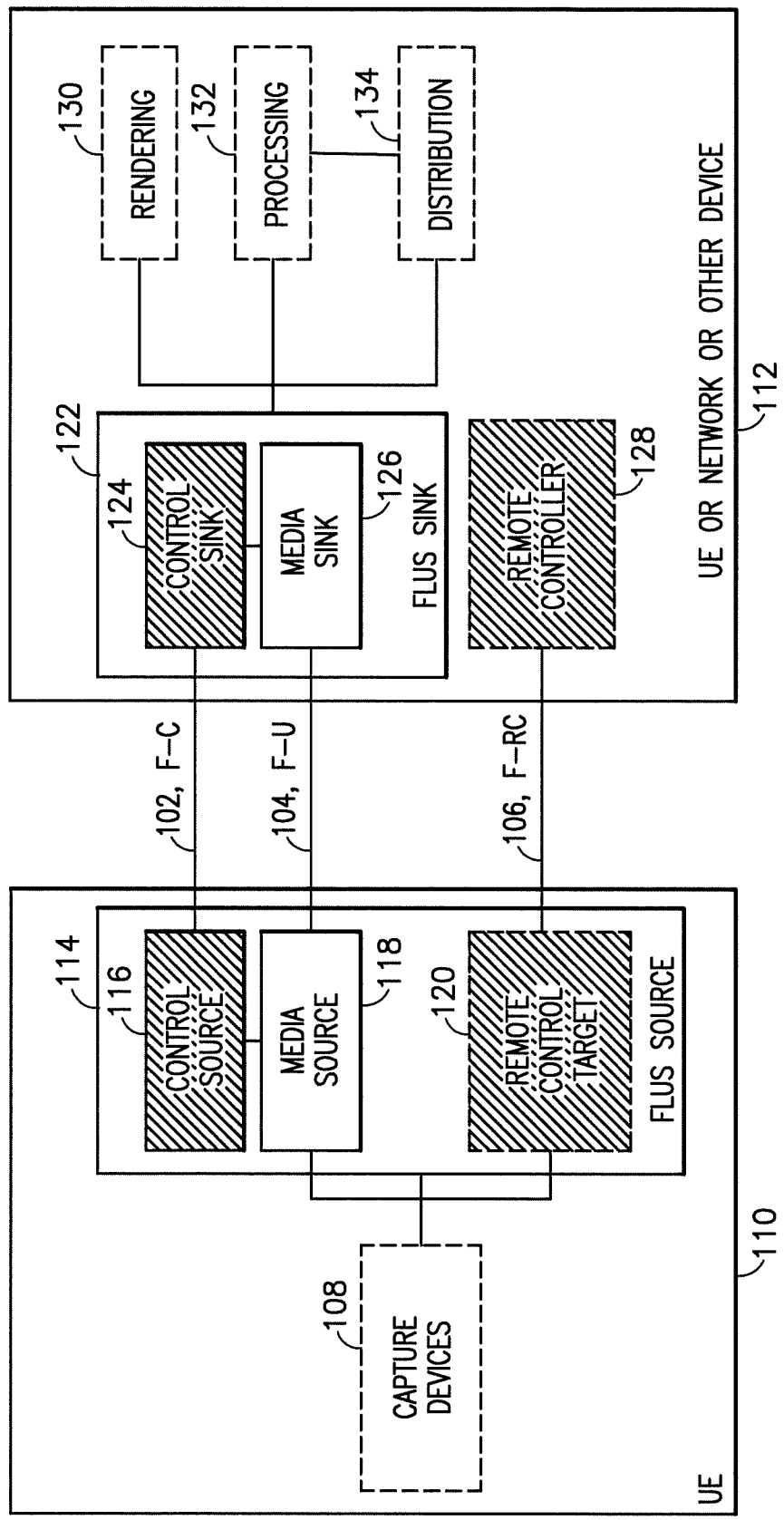
FIG. 1 illustrates the FLUS architecture (3GPPP TS26.238 uplink streaming).

FIG. 1 illustrates the FLUS architecture (3GPP TS26.238 uplink streaming). 3GPP SA4 FLUS—The Framework for Live Uplink Streaming (FLUS) is an enabler for live media streaming from a source entity (such as FLUS source 114) to a sink entity (such as FLUS sink 122). FLUS offers an IMS-based and a non-IMS-based instantiation. The IMS/MTSI-based instantiation enables the establishment of live media streaming between two UEs (such as UE 110 and UE or network or other device 112) or between a source entity (such as FLUS source 114) and a sink entity (such as FLUS sink 122), within and across operator networks. [FLUS specification is 3GPP TS 26.238: "Uplink streaming"].

As shown in FIG. 1, capture devices 108 are connected to FLUS source 114. FLUS source 114 comprises a control source 116, a media source 118, and remote control target 120. The UE or network or other device 112 comprises FLUS sink 112 and remote controller 128, where the FLUS sink 122 comprises control sink 124 and media sink 126. The FLUS sink 122 is used for rendering 130, processing 132, and distribution 134. Control source 116 is connected to control sink 124 via a F-C interface 102, media source 118 is connected to media sink 126 via a F-U interface 104, and remote control target 120 is connected to remote controller 128 via a F-RC interface 106.

MPEG NBMP (Network-based Media Processing) is a new standard (ISO/IEC 23090-8) in MPEG MPEG-I. It is at FDIS (Final draft international standard) stage from January, 2020.

The NBMP framework defines the interfaces including both data formats and APIs among the entities connected through the digital networks for media processing for applications to access the entities and configure their operations remotely for efficient intelligent processing without human intervention.

Figure 2:
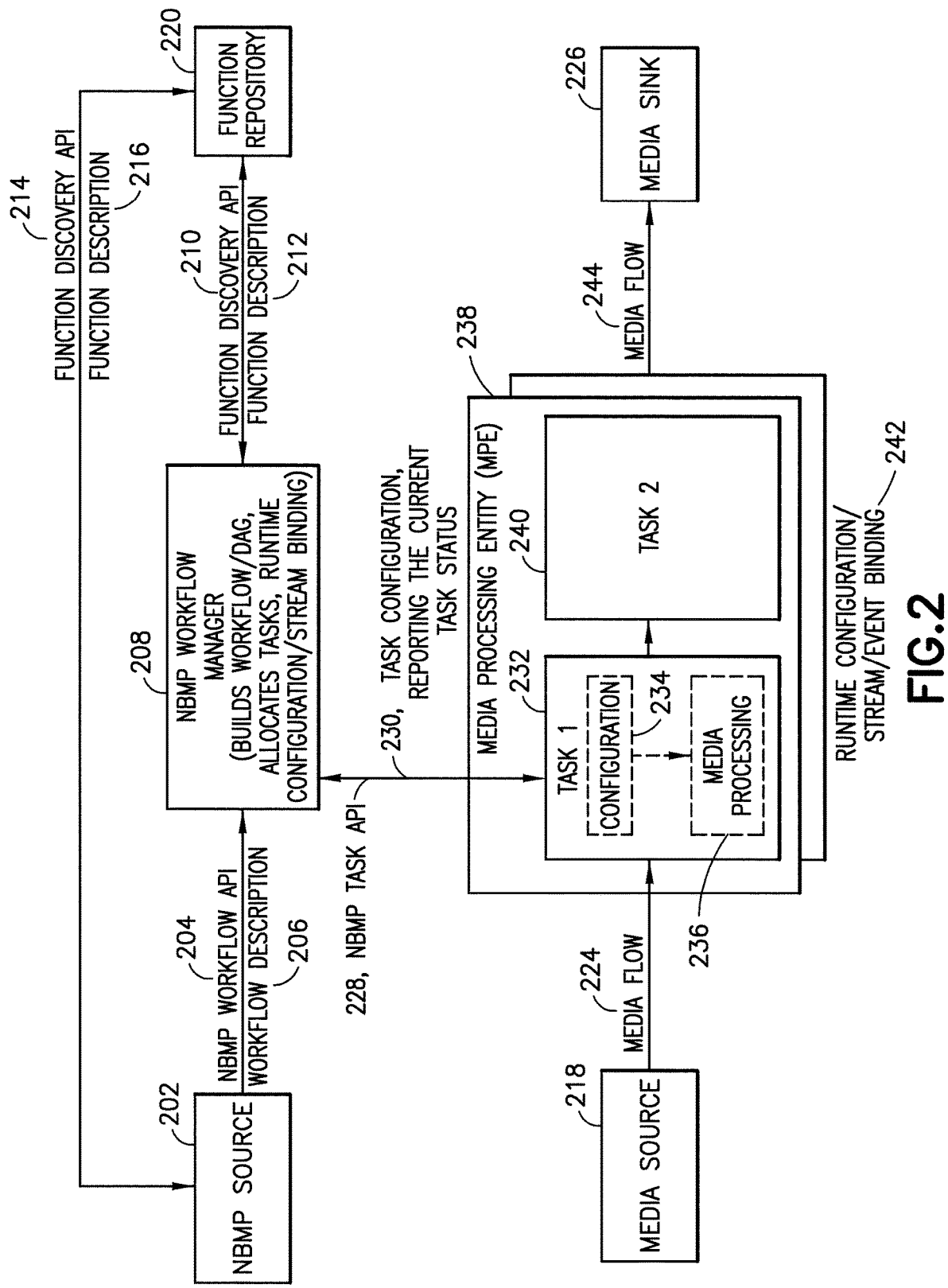
FIG. 2 illustrates the NBMP architecture (ISO/IEC 23090-8).

An example NBMP framework is depicted in FIG. 2. NBMP source 202 provides a workflow description 206 to the NBMP workflow manager 208 via NBMP workflow API 204. The NBMP workflow manager 208 builds a workflow/ DAG, allocates tasks, and provides runtime configuration/ stream binding. The NBMP workflow manager 208 exchanges a function description 212 using a bidirectional communication with the function repository 220 via the function discovery API 210. As shown, NBMP source 202 exchanges a function description 216 in bidirectional communication with function repository 220 via function discovery API 214.

As further shown in FIG. 2, media source 218 provides media flow 224 to the media processing entity (MPE) 238 for task 1 232, where task 1 232 comprises a configuration 234 and media processing 236. The MPE 238 is responsible for runtime configuration/stream/event binding 242. Task 1 exchanges a task configuration, and reporting of the current task status 230 in bidirectional communication with the NBMP workflow manager 208 via the NBMP task API 228. Media flow is forwarded from task 1 232 to task 2 240. Media flow 244 is forwarded from task 2 240 to the media sink 226.

The 3GPP SA WG4 on Codecs has a new work item on "Study on use of NBMP in FLUS". The work item has the following objectives:

a) develop a detailed workflow of the establishment of a FLUS session and NBMP workflow based on TS26.238 uplink streaming;

b) investigate if any signaling, format, or protocol is missing from the TS26.238 and NBMP specifications to successfully establish the above workflows;

c) collect relevant and example use cases for the described environment;

d) map 3GPP network QoS parameters to the NBMP QoS parameters and identify the possible missing QoS parameters in the NBMP specification; and e) investigate the possible improvements and extensions of the workflow by enhancing TS26.238 and NBMP specifications.

The output of this study is to extend TR26.939 [3GPP TR26.939 Guidelines on the Framework for Live Uplink Streaming (FLUS) https://portal.3gpp.org/desktopmodules/Specifications/SpecificationDetails.aspx?specificationId=3394 (last accessed Dec. 21, 2020)] to include the combined FLUS and NBMP workflow, detailed description of necessary operations, and example use cases.

A media processing workflow consists of processing tasks (e.g. task 1 232 and task 2 240 of FIG. 2). Each task can have zero, one, or many media and metadata input and output. Technically a task can use different transport protocols for different input or output. It is, however, not practical for every media processing task to support multiple media transport protocols. Also, a single media data can be processed/consumed by one or multiple tasks concurrently in case of parallel setup. This can further complicate the individual task implementations if they need to handle different transport protocols as well as the need for forwarding data to the one or more subsequent tasks according to the workflow specified parameters.

An MPE (media processing entity or application), such as MPE 238 of FIG. 2, can play the role for media data transmission. But it has limitations and it is available only to the task(s) running within the same MPE. A solution is needed to support all tasks and covers input and output not only between tasks, but also the media sources and media sinks. This is so that media I/O to tasks can be transparent and independent to the transport protocols, especially for external media sources and sinks, such as media source 218 and media sink 226 of FIG. 2.

A NBMP task is described by a function description document (FDD) so that the input and output schema should be designed carefully to support I/O virtualization. The examples described herein are generalizable, but use 3GPP FLUS as a concrete implementation example for media uplink streaming with push and pull capabilities.

Figure 3:
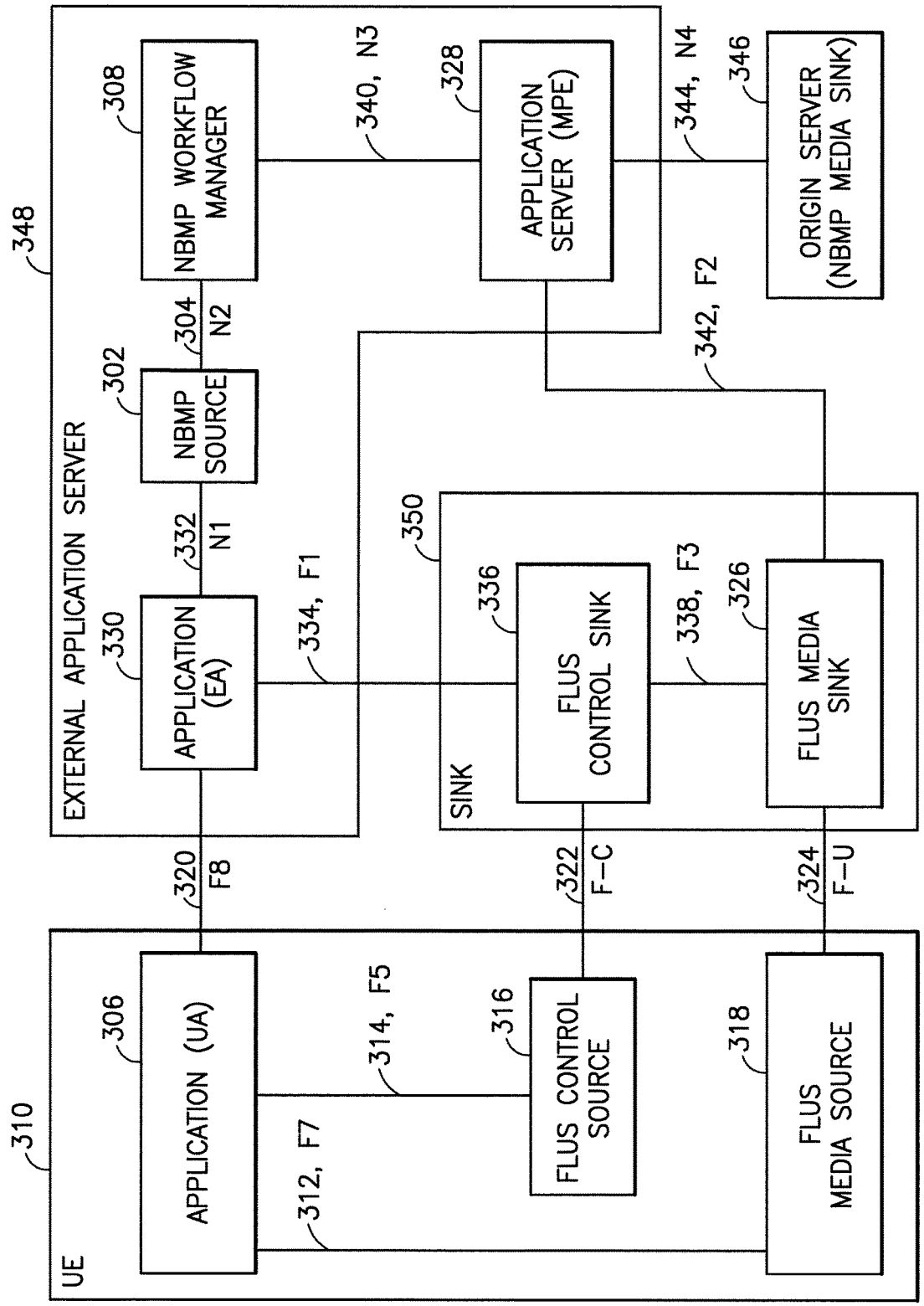
FIG. 3 illustrates a scenario of interworking between FLUS and NBMP.

FIG. 3 illustrates a scenario of interworking between FLUS and NBMP. FLUS media sink would act as a NBMP media source (e.g. see FLUS Sink 350). The NBMP workflow manager 308 and associated MPE 328 are independent entities. The FLUS sink 350 and FLUS control source 316 interact with the NBMP via an external application 330, initiating the workflow via the NBMP source 302. The FLUS sink 350 delivers media to the NBMP MPE 328, acting like an NBMP media source.

As further shown in FIG. 3, the UE 310 comprises UE application (UA) 306, FLUS control source 316, and FLUS media source 318. Sink 350 comprises FLUS control sink 336 and FLUS media sink 326, and external application server 348 comprises external application (EA) 330, NBMP source 302, NBMP workflow manager 308, and application server (MPE) 328.

Figure 6:
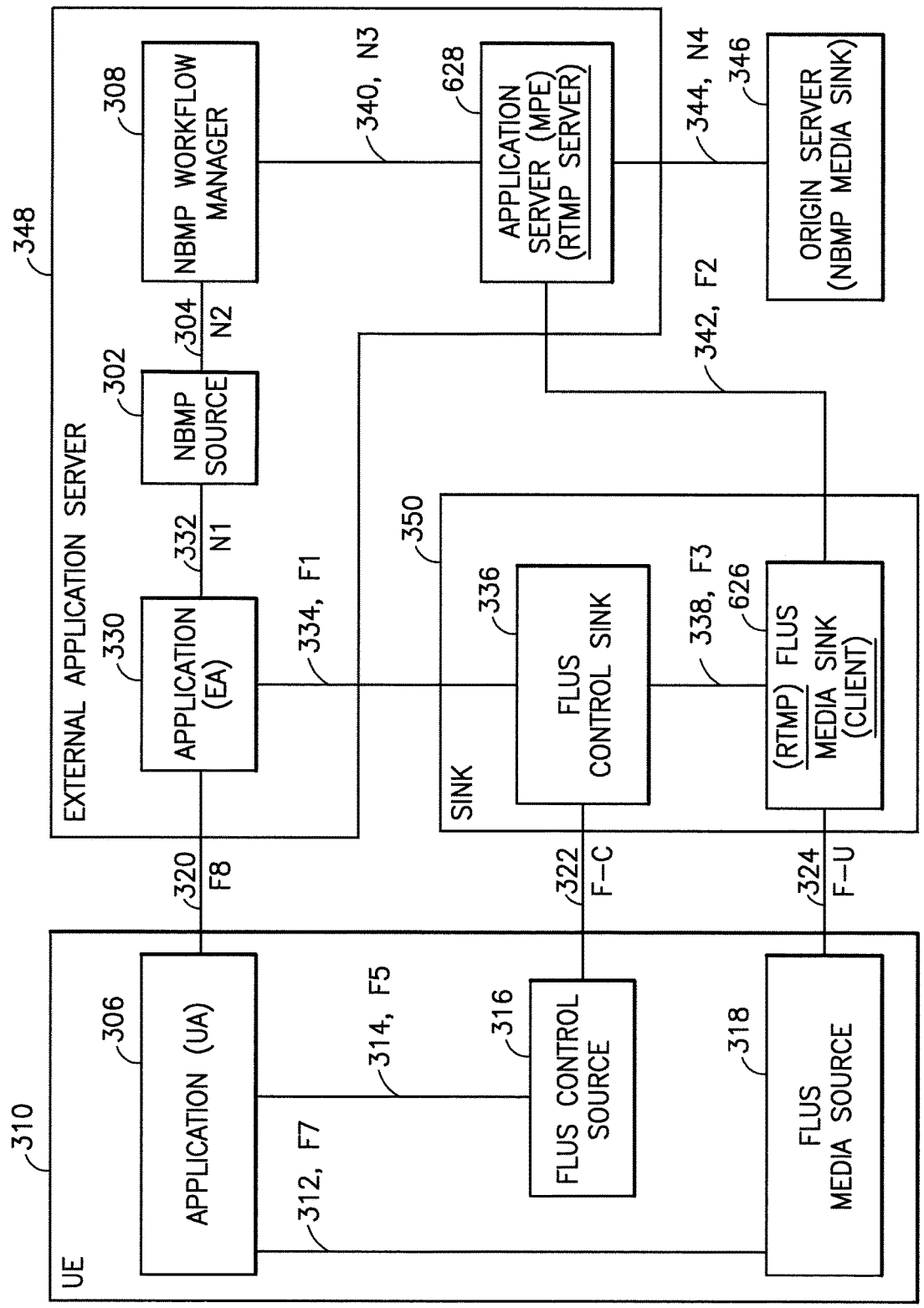
FIG. 6 shows a PUSH mode example: RTMP protocol for media push-type ingestion.
Figure 8:
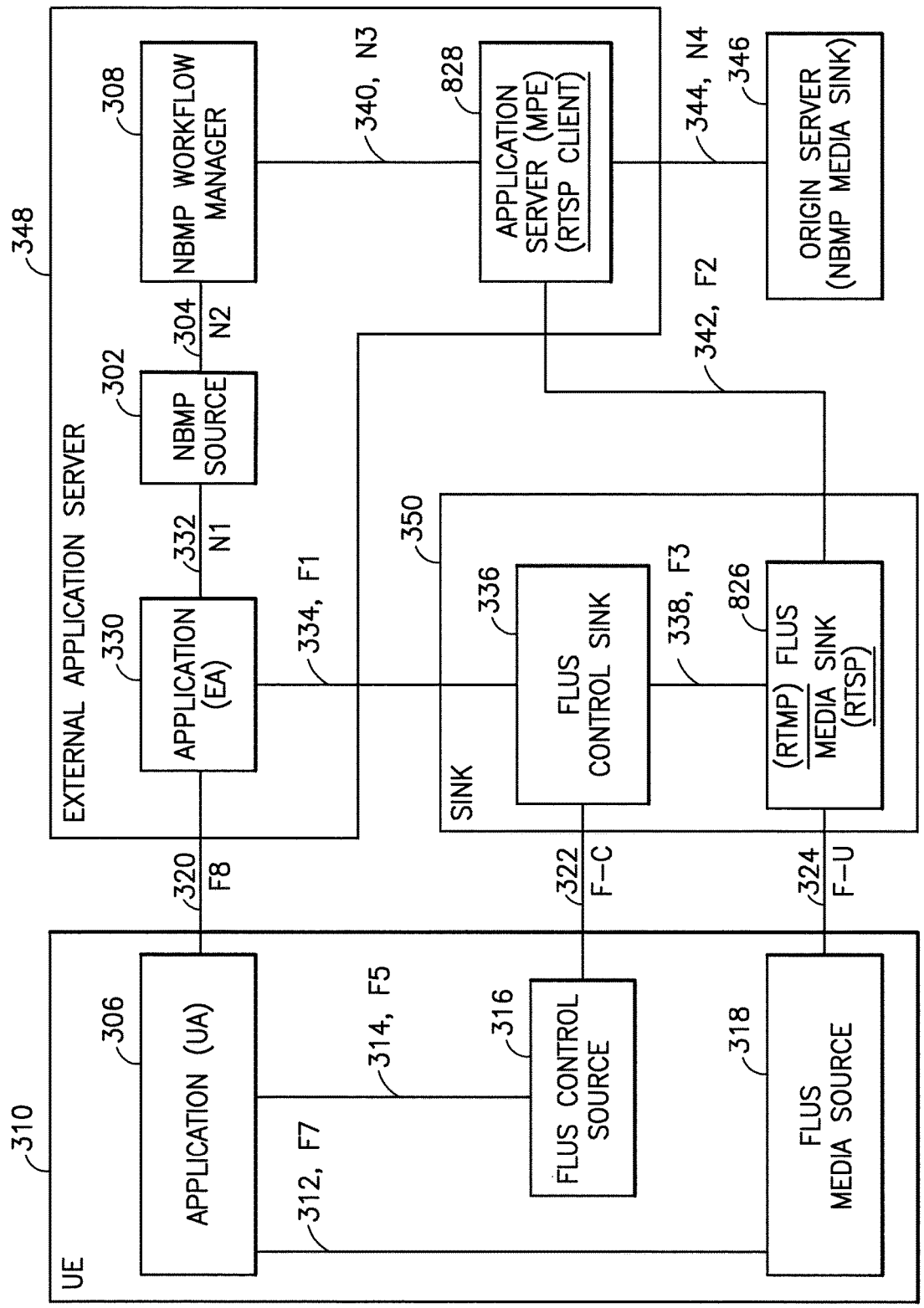
FIG. 8 shows an NBMP pull example (RTMP for push and RTSP protocol for pull).

UA 306 communicates with EA 330 via the F8 interface 320, the FLUS control source 316 communicates with the FLUS control sink 336 via the F-C interface 322, and the FLUS media source 318 communicates with the FLUS media sink 326 via the F-U interface 324. EA 330 communicates with NBMP source 302 via the N1 interface 332, NBMP source 302 communicates with the NBMP workflow manager 308 via the N2 interface 304, and the NBMP workflow manager 308 communicates with the application server (MPE) 328 via the N3 interface 340. EA 330 communicates with the FLUS control sink 336 via the F1 interface 334, FLUS control sink 336 communicates with the FLUS media sink 326 via the F3 interface 338, the FLUS media sink 326 communicates with the application server (MPE) 328 via the F2 interface 342, and the application server (MPE) 328 communicates with the origin server (NBMP media sink) 346 via the N4 interface 344. As shown in FIG. 6 and FIG. 8, the F2 interface 342 may be used to communicate between the FLUS media sink 326/626/826 and the MPE 328/628/828 with varying implementations.

Figure 4:
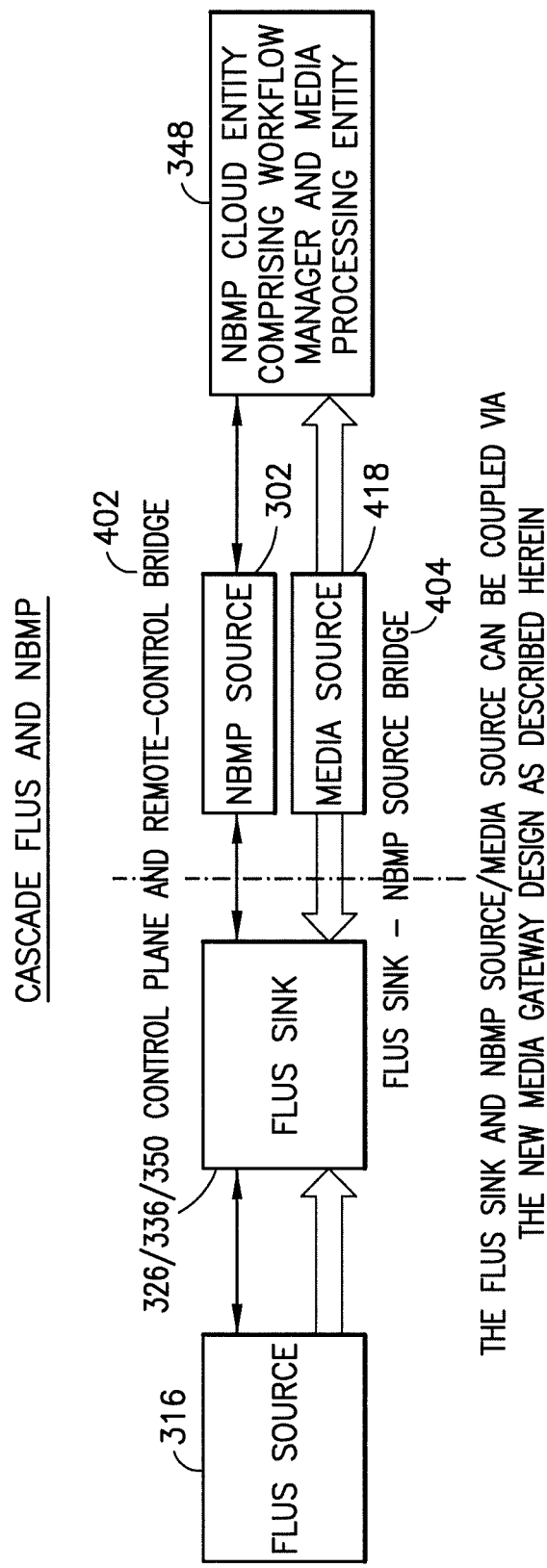
FIG. 4 illustrates a cascade connection between FLUS and NBMP.

FIG. 4 illustrates a cascade connection between FLUS and NBMP. The FLUS control sink 336 interacts with the NBMP source 302 to control the workflow creation. The FLUS media sink 326, on the other hand, interacts with the MPE (such as MPE 328 in FIG. 3) performing the functionality of an NBMP media source. Accordingly, FIG. 4 illustrates that the FLUS sink and NBMP source/media source can be coupled via a new media gateway design as described herein. In particular, the FLUS sink 350, where the FLUS sink 350 comprises a FLUS control sink 336 and FLUS media sink 326, can be coupled to the NBMP source 302 and the media source 418 via control plane and remote-control bridge 402 as well as the FLUS sink—NBMP source bridge 404. As shown in FIG. 4, the NBMP source 302 and media source 418 are coupled to (in communication with) the NBMP cloud entity 348, where the NBMP cloud entity 348 comprises the workflow manager 308 and media processing entity 328.

In some examples, the control plane and remote-control bridge 402 may be one or more of the F1 interface 334 or the F2 interface 342 as shown in FIG. 3, and the FLUS sink—NBMP source bridge 404 may be the F-U interface 324 as shown in FIG. 3. Furthermore, the control plane and remote-control bridge 402 and the FLUS sink—NBMP source bridge 404 may be the same bridge, for example, comprising one or more of the F1 interface 334, the F2 interface 342, or the F-U interface 324 as shown in FIG. 3.

Interworking Problems within NBMP:

The data connection between workflow tasks in NBMP simply use the media URLs and "protocol" parameters described in the input descriptor. It assumes the system would connect them at the time when the tasks' states are in "running" states. However, it is not realistic for media processing task implementers to support many different protocols and media types.

The system can provide media I/O and streaming (push or pull) capabilities with various protocol support; and support point-to-point (task-to-task) and branching the media flow (one to many).

As said, MPE (media processing entity) can play the role of the transportation network, as one MPE can host one or many tasks. Another clean design is to have a dedicated/centralized media service component to run as a media gateway.

FLUS-NBMP Interworking Problems:

In some cases, direct physical connect between media sources like FLUS media sink and NBMP task is not allowed or possible. This can occur due to NAT/FW or lack of support for the supported implementation for the signaling and transport protocols between the NBMP MPE (or NBMP Task) and FLUS media sink (1013 In FIG. 10, for example).

The FLUS sink and NBMP source as well as the NBMP media source can be coupled via the new proposed media bridge design described herein.

There is no existing solution to address the aforementioned problems, including the interworking problems within NBMP, and FLUS-NBMP interworking problems.

Thus, the examples described herein provide supplementary signaling and mechanisms to support both interworking between media sources, for example, enabling 3GPP FLUS (ingestion service) and NBMP processing tasks (e.g. a media processing service), as well as NBMP internal media transmission (between the different work-flow tasks). NBMP supports data ingestion (push) and collection or retrieval (pull) modes.

The examples described herein provide a media streaming layer or gateway or media-bridge that supports both push and pull modes for externally faced upstreaming and downstreaming (media source and media sink); as well as internal media sharing (pull) and streaming (push) for data transmission among processing tasks.

In a more general sense, upstreaming is performed by an entity providing media or data to the subsequent entity in a sequence of entities forming a media processing pipeline or workflow. Thus upstreaming and downstreaming are relative, terms. For example, a downstreaming entity can be an upstreaming entity for the subsequent task or entity.

The entity can thus be referred to as a media or data source (for upstreaming) and media or data sink (for downstreaming).

The proposed I/O layer can support different media ingestion modes to external data sources but internally it provides a unified interface and transport protocol that supports efficient media dissemination with peer-to-peer (p2p) security and protection. The proposed I/O layer can further support multiple signaling and transport protocols on the same data source and even media formats (from raw media chunks to compressed data fragments) and codecs (compression methods).

The examples described herein are applicable for the following scenarios (1.-4.):

1. When the FLUS media sink is the media sender/client to the NBMP media source (media receiver), in other words, when the NBMP is ingesting media in PUSH mode, the media entrypoint URL is generated by the NBMP entities, e.g., NBMP tasks or the new media I/O layer.

2. When the FLUS media sink is the media server to the NBMP media source (media pull client), in other words, the NBMP ingests media in PULL mode (media entrypoint URL is provided by the Media Source). When NBMP requires the PUSH mode, the media I/O layer can act in the forward mode (pull first and push to NBMP). It is all about the needs of NBMP systems.

3. Extension signals to the NBMP input descriptor and output descriptor used by the Workflow Description Document (WDD) and Task Description Document (TDD) to cover different media ingestion modes and attributes for real-time and video-on-demand (VDD) scenarios. Additional attributes such as availability (live, persistent, duration, latency), mode (PUSH or PULL) and priority are proposed for the input/output descriptor of NBMP WDD.

4. Abstract media gateway (I/O layer) for both external and internal media streams (support push/pull modes). Media streams defined as "caching-server-url" are urls of the Media Gateway. NBMP tasks treat external media as internal ones in a consistent and transparent way. The gateway can be implemented as a centralized service or middleware to offer multiple I/O channels. It can also be realized in a distributed mode. It can be part of the MPE (media processing entity) within which NBMP tasks reside and run. The benefits of such distributed I/O layer to MPEs can enable the deployment of MPEs and tasks in edge computing environments (e.g. ETSI's MEC). Cached media data can stay in MPEs near to the media source, sink, and tasks, when low-latency requirement is needed.

In another embodiment, an extension to the WDD in NBMP is provided which enables smooth transitions or seamless inter-working between the FLUS and NBMP entities. The current NBMP does not define state or availability of the incoming/outgoing media streams. Consequently the following is proposed to be added: an indicator to describe the working mode of input such as the FLUS sink; and orchestration between the FLUS sink and workflow manager.

Provided next are the implementation details of the examples described herein.

Some of the differences are highlighted with an asterisk (*) within this description and with a dashed box within the figures (FIG. 5 and FIG. 7) to describe the added procedures in the 3GPP FLUS-NBMP Study Item. Not all of the features might be specified by the standard but the examples described herein cover these aspects.

I) FLUS Push Content to the NBMP

The media push from upstream FLUS (media source) is first described. In order to publish media to the NBMP Task/MPE, the NBMP workflow is deployed and is in the "running" state.

Figure 5:
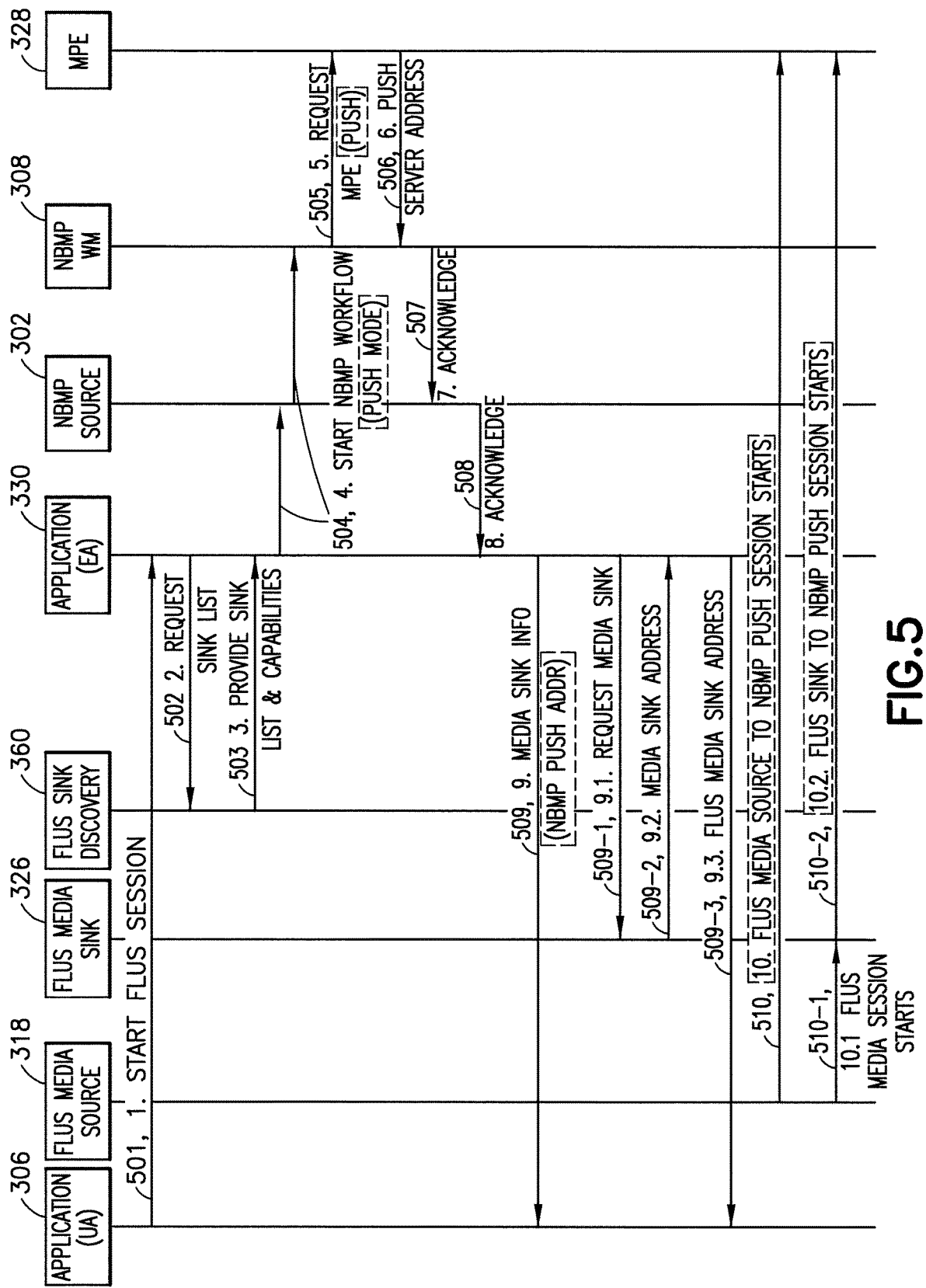
FIG. 5 is an example sequence diagram showing the FLUS push media to NBMP process.

The steps of establishing and operating a FLUS-NBMP session are as the following (1.-10., corresponding respectively to items 501-510 as shown in FIG. 5):

1. At 501, UE Application (UA) 306 makes a request through F8 320 (see FIG. 3) to Application (EA) 330 to start a live session.

2. At 502, the EA 330 retrieves the user profile and identifies the resources needed to run the service. Also at 502, the EA 330 requests the list of FLUS sinks and their capabilities from sink discovery server 360.

3. At 503, the FLUS sink discovery server 360 provides the sink list and capabilities to the EA 330.

4. At 504, the EA 330 requests NBMP Source 302 to start an NBMP workflow and tells NBMP to run on push mode with the protocol supported or preferred by FLUS sink 350 (including FLUS media sink 326). NBMP source 302 builds the WDD, and requests NBMP workflow manager 308 to instantiate the workflow, with the assigned MPE.

5. At 505, NBMP workflow manager 308 discovers various MPEs and finds an enough number of MPEs (such as MPE 328) to run the workflow.

6*. At 506, the push entrypoint is ready through the MPE 328 (or dedicated media gateway, which is not shown in the sequence diagram, as it is implementation specific). The entrypoint address is returned to the workflow manager 308.

7. At 507, NBMP workflow manager 308 responds to NBMP source 302 with an updated WDD and push entrypoint "caching-server-url" created (the number of entrypoints are the same as the number of inputs).

8. At 508, the NBMP Source 302 acknowledges workflow instantiation to EA 330 together with the push entrypoint address.

9*. At 509, EA 330 responds to UA 306 with the NBMP push address. 9.1*. Alternatively, at 509-1, EA 330 asks the FLUS media sink 326 for the streaming address. 9.2*. At 509-2, the FLUS media sink 326 responds with the address. 9.3*. At 509-3, the EA 330 responds with the FLUS media sink address to UA 306 (this operation can be combined with Step 9 509.

10*. At 510, the UA 306 requests FLUS control source 316 (see FIG. 3) to establish the FLUS session. With the NBMP push address, FLUS media source 318 starts ingesting the content directly to the NBMP entrypoint address. 10.1. Alternatively, at 510-1, if the FLUS media source 318 is not allowed or unable to push data directly to NBMP push entrypoint, at least FLUS media source 318 can start ingesting the content to the FLUS media sink 326. 10.2*. At 510-2, the FLUS media sink 326 can then ingest the content to the NBMP entrypoint (F2 342 in FIG. 6). As shown in FIG. 6, the RTMP FLUS media sink (client) is item 626, corresponding to FLUS media sink 326 of FIG. 3, and the application server (MPE) RTMP server is item 628, corresponding to the application server (MPE) 328 shown in FIG. 3.

The possible flow is described with a single entrypoint. There can be more than one entrypoint for multiple ingestions. They can run concurrently or in different orders.

II) NBMP Pull Content from FLUS

This is the 2nd case where the NBMP can pull the content from FLUS, and UA 306 pushes the content during a FLUS session.

Figure 7:
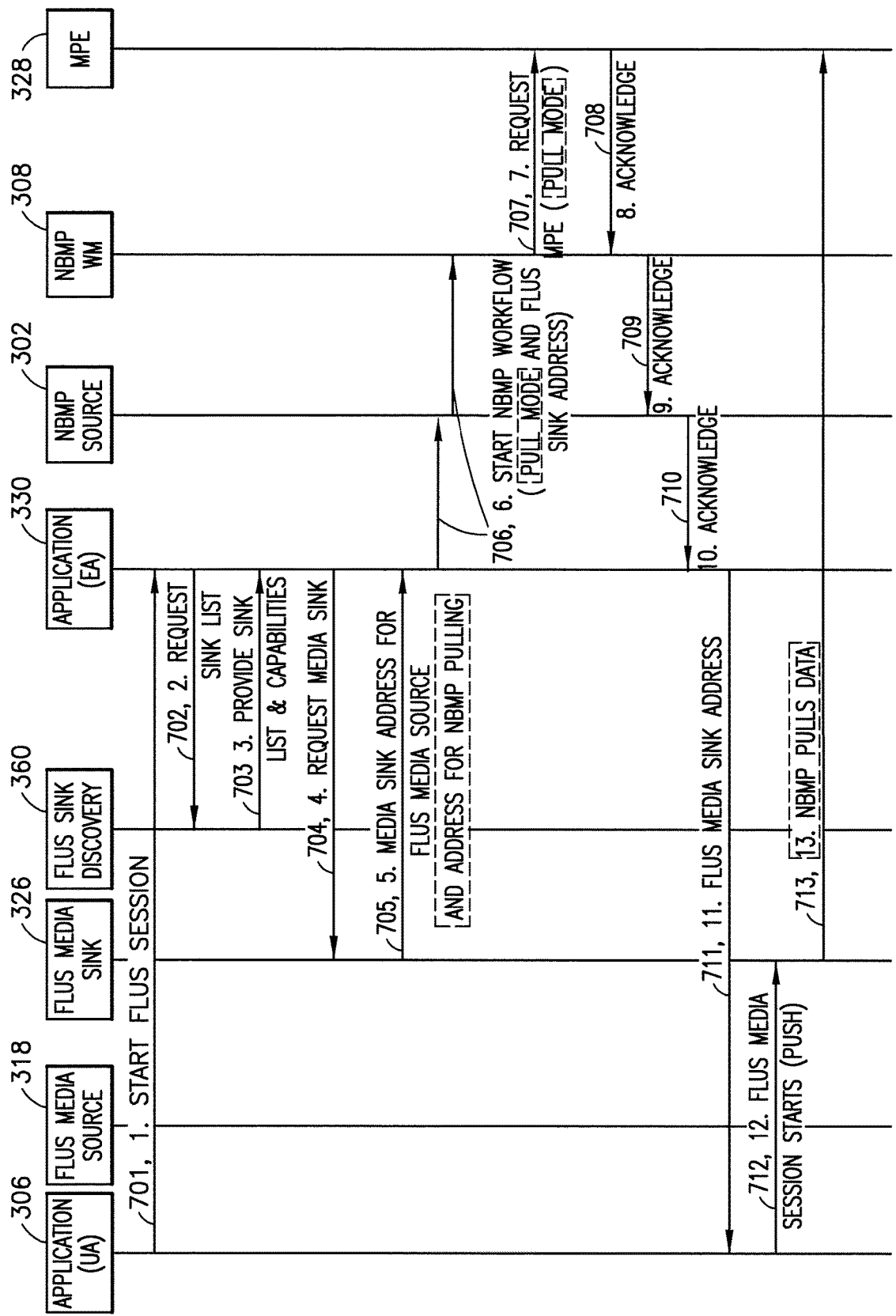
FIG. 7 is an example diagram showing NBMP pulling media from FLUS.

The steps of establishing and operating a FLUS-NBMP session are the following (1.-13. in FIG. 7, corresponding respectively to items 701-713). As with FIG. 5, for FIG. 7 some of the differences are highlighted with an asterisk (*) within this description and with a dashed box within FIG. 7 to describe the added procedures.

1. At 701, UE Application (UA) 306 makes a request through F8 320 (see FIG. 3) to Application (EA) 330 to start a live session.

2. At 702, EA 330 retrieves the user profile and identifies the resources needed to run the service. In addition, the EA 330 requests the list of FLUS sinks and their capabilities from sink discovery server 360.

3. At 703, the FLUS sink discovery server 360 provides a sink list and capabilities to the EA 330.

4. At 704, EA 330 picks a sink and finds its FLUS media sink address.

5. At 705, the EA 330 retrieves the user profile and identifies the resources needed to run the service. 5.1*. In order to allow pulling data from the FLUS media sink 326 directly, an additional pulling address can be created and returned to EA 330. It is possible for some transport protocols that the pull and push addresses can be identical.

6*. At 706, the EA 330 requests the NBMP Source 302 to start an NBMP Workflow with the "caching-server-url" filled with the value of the FLUS pull address obtained in Step 5 705.

7. At 707, the NBMP Workflow Manager 308 discovers various MPEs and finds an enough number of MPEs to run the workflow.

8. At 708, with the acknowledgement from MPE 328, NBMP Workflow Manager 308 instantiates the workflow and gets the workflow in running state.

9. At 709, the NBMP Workflow manager 308 responds to NBMP Source 302 with updated WDD.

10. At 710, NBMP Source 302 acknowledges workflow instantiation to EA 330.

11. At 711, EA 330 responds to UA 306 with control sink and media sink information.

12. At 712, UA 306 requests FLUS Control Source 316 (see FIG. 3) to establish the FLUS session. FLUS media source 318 starts ingesting the content to FLUS media sink 326.

13*. At 713, when the data is available at the FLUS media sink 326, NBMP Tasks/MPE 328 (i.e. which entity(ies) has the pull addresses (obtained in Step 6 706)) can pull content.

Accordingly, FIG. 8 shows an NBMP pull example (RTMP for push and RTSP protocol for pull), where items 826 and 828 of FIG. 8 (namely (RTMP) FLUS media sink (RTSP) 826 and application server (MPE) (RTSP client) 828) differ from items 626 and 628 of FIG. 6 (namely (RTMP) FLUS Media Sink (client) 626 and application server (MPE) (RTMP server) 628).

III) Signaling to NBMP Input and Output Descriptors

NBMP (Network-based Media Processing) is the ISO standard that specifies a generic framework for processing tasks in the network (the cloud). The processing work is in the form of a workflow that consists of tasks. Each task can have one or more inputs and outputs and they form a DAG (directional acyclic graph).

In some embodiments, the input/output descriptors may not carry explicit signaling of push/pull input or output protocols. The workflow manager may derive the nature based on the supported protocols by the function descriptions.

Furthermore, the workflow manager may select the appropriate protocols between the two or more connected tasks (based on the protocols supported by each of them).

Consequently, the media gateway is configured in accordance with the selected protocols by the workflow manager.

Figure 9:
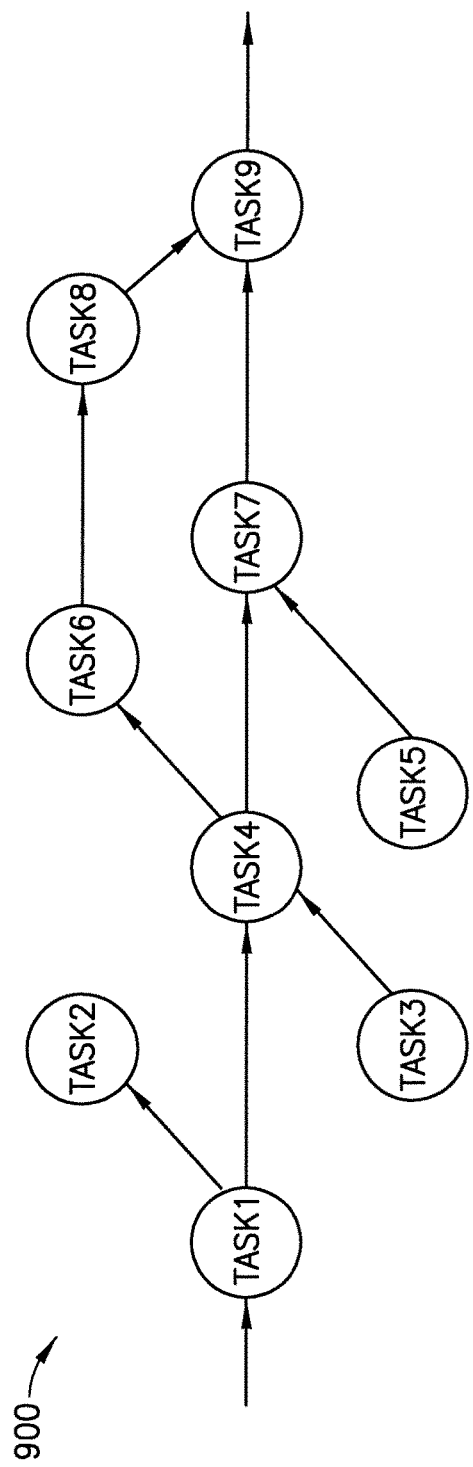
FIG. 9 shows an example NBMP workflow.

FIG. 9 shows an example NBMP workflow 900 comprising tasks 1 through 9. The input (e.g. arrow going into a task in FIG. 9) and output (e.g. an arrow coming out of a task in FIG. 9) of each task (the instance of media processing function) is described in the Function Description Document (FDD). FDD consists of descriptors including Input and Output Descriptors containing the information such as the media format and types. In order to support flexible types of media transportation, new parameters are included as described herein.

Table 1 shows the new parameters to be added to NBMP Descriptors, for instance, the Input and Output Descriptors. Each task can have one or multiple inputs and outputs. Each input/output defines one type of media stream(s) (data).

TABLE 1

| availability | live | "live" is a Boolean flag which indicates whether the content being streamed by the media source is live |
| --- | --- | --- |
| | persistence | "persistence" is a Boolean flag which indicates whether the content is available for the long term (e.g., even after the live streaming has ended) |
| | duration | "duration" is time in seconds which indicates the duration for which the content is available. This value is expected to be present only if the persistence flag is True |
| | latency | "latency" can be in milliseconds or seconds to indicate the delay between the Media Source and arrival of content at the media processing entity or task |
| mode | | The "mode" can be either "pull" or "push". It should work with the "protocol" parameter together in NBMP Input/Output descriptors |
| priority | | The "priority" value is an integer to indicate if the particular instance of the output format is made available or not depending on the resource availability while executing the workflow. This is important when multiple output delivery methods are to be described in the WDD. The range may be in the scale of 1 to 100. |

The "priority" value in one embodiment can be associated with the resource availability percentage defined in NBMP systems. For instance, the value "100" means that the output with the "priority" value shall be guaranteed. The value "50" indicates that all entities (NBMP tasks or media sinks) consume this output only when the percentage of the available resource is at 50% level.

In another embodiment, the association (priority and resource availability) can be implemented based on certain range segments other than a 1-to-1 mapping, depending on the design of the "priority" value number. For example, given the priority value "5" with the scale of "1" to "10", it means that the output becomes available when the resource is in the range of 50%-59%, or other ranging methods could be applied.

In yet another embodiment, the priority indicates that a particular output is essential (e.g., if priority is 1 and best effort if priority is greater or less than 1). Here the value "1" is an example. Any other values or types like Boolean may be applied to define the essential level. If there is insufficient resource for any output with priority 1, the workflow creation may be aborted or delayed. This makes the use of priority clear to the workflow manager in case of multiple outputs with different priorities are defined. One such example is in case of a workflow, a particular compression version, say HEVC video codec, may be essential (with priority 1) whereas when another output version with VVC may be optional, then that output will have priority greater than 1.

IV) Abstract Media I/O Push/Pull Layer

Figure 10:
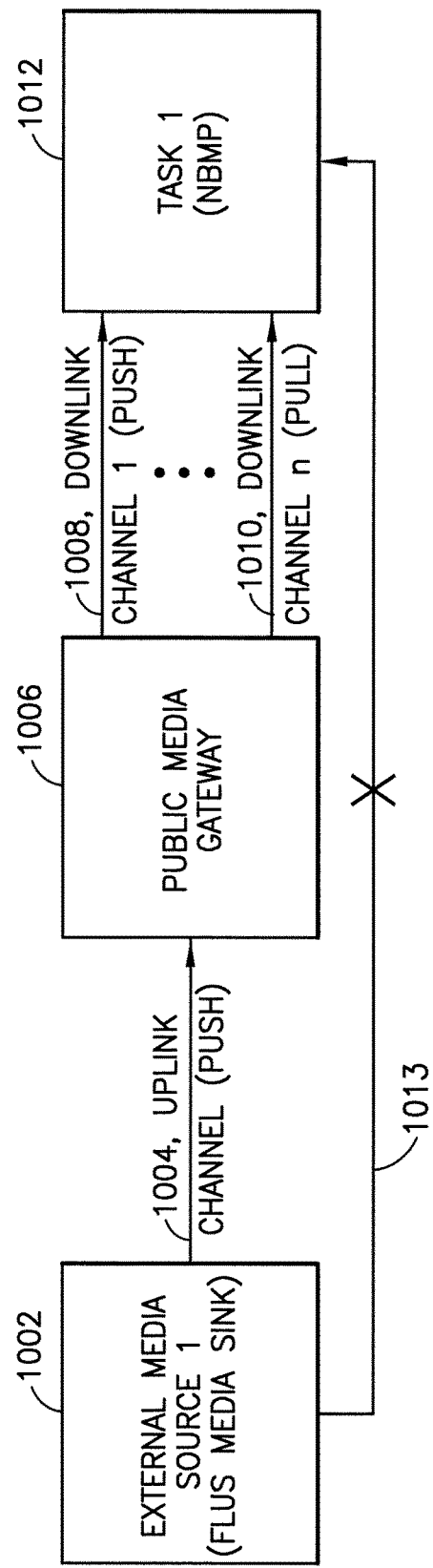
FIG. 10 illustrates direction connection constraints and single ingest type (push) to push/pull data branching.

In practice, the direct network connection between a media source (e.g. FLUS upstream service) and NBMP MPEs or tasks cannot be available due to the NATs, firewalls or other security constraints (e.g. the connection 1013 in FIG. 10). Especially when the number of media ingestion increases, the demand for individual connections (regardless to the push or pull modes) makes the management almost impossible to handle such dynamic requests, for example, through publicly accessible TCP/UDP ports.

It is a common design pattern by almost all cloud providers or service architects to use a single public API gateway. The concept is applied by the examples herein by introducing the media gateway (also referred to as media bridge) concept. The gateway can handle, not only the external upstreaming and downstreamings, and also be used for internal communication between NBMP tasks (workflows).

An abstract logic component called a media gateway 1006 (or media bridge) is thus defined for the examples described herein. Internally it can transport media data between tasks. Externally, it provides interfaces for NBMP Media Source and Media Sink. It can have several implementation options, like a centralized server component for all tasks, or MPE (though there're multiple MPE instances) per workflow session.

The service can create interfaces for multiple media input and output pairs and provides other capabilities like media caching, and transcoding if needed.

Workflow Manager sends the request with basic I/O requirements from the Workflow Description Document (WDD), mainly from the Input and Output Descriptors like "mode" and "protocol". The Media Gateway starts the I/O servers and responds with the server information in URLs (ingest URL and egest URL).

Referring to FIG. 10, when the direct physical connect 1013 between an external media source 1002 (such as FLUS media sink 326) and an NBMP task 1012 is not allowed or possible, the MPE or media gateway 1006 can be used to open the uplink channel 1004 for external media source 1002 (FLUS Media Sink 326) for ingestion. When an uplink 1004 is created, one or more downlink channels 1008/1010 per uplink stream 1004 can be created. Downlink channels 1008/1010 can support different transport protocols and modes (push or pull), or even different media formats (compressed or raw).

The "priority" parameter in Table 1 can allow or trigger dynamic connection re-configuration to different channels, e.g. media output formats (compressed or raw), or qualities, during the workflow lifecycle, when the available computing resource changes (lower or higher bandwidth or CPU/GPU capabilities).

Abstract Media Gateway for inter-task media communication. NBMP describes the data flows between tasks by defining the connections from the output of the upstream tasks to the input of the downstream task(s). For example, the upper part of FIG. 11 where the output port ("output_01") 1104 of the "Task i" 1102 can be consumed by the "Task j" 1106 and "Task k" 1110 using their "input_01" ports respectively (1108 and 1112). With the assistance of the added parameters e.g. the working modes, to the Input and Output Descriptors, the Workflow Manager can connect various processing function implementations together, even when they support a single type of transportation mode, only.

Figure 11:
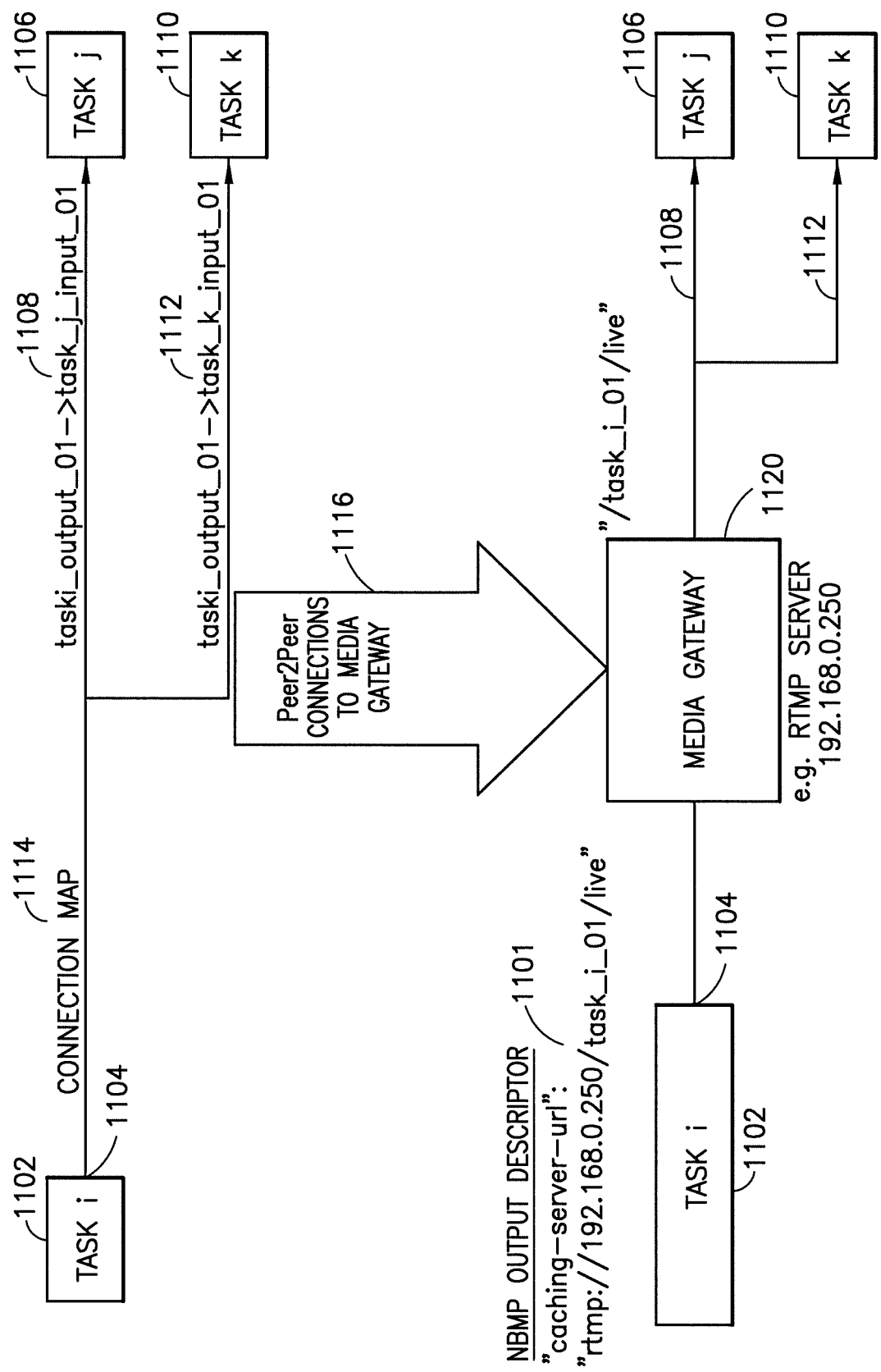
FIG. 11 is an example of a media I/O layer (gateway or MPE) for inter-communication (Push→Pull example).

Further, FIG. 11 is an example of a media I/O layer (gateway or MPE) 1120 for inter-communication (Push→Pull example). FIG. 11 shows a connection map 1114 between task i 1102 and task j 1106 and task k 1110. As shown, the connection map 1114 may resolve via the peer-to-peer ("Peer2Peer") connections to media gateway 1120 (e.g. the media gateway 1120 provides the bridge between the processing of task i 1102 and task j 1106 and task k 1110).

With reference to FIG. 12A, when connecting 2 tasks (e.g. task i 1202 and task j 1206) with the same modes, e.g. the "pull" mode (refer respectively to 1204 and 1208), the connection 1210 may be made directly between those tasks. Data itself can be cached either by the task implementation itself or any caching solution provided by the system, such as a storage device in the MPE 328 or the cloud storage as long as those connected tasks have the access). The "caching-server-url" (refer e.g. to item 1101 of FIG. 11) can even be the network address of the output port 1214 (task i 1202). As shown in FIG. 12A and FIG. 12B, task i 1202 comprises input port 1212 and output port 1214, and task j 1206 comprises input port 1216 and output port 1218.

When two tasks are in different modes (see FIG. 12B), direct connection between tasks becomes a problem. For example, the output mode 1220 of Task i 1202 is "push", which requires a target URL (Sink URL) for content delivery. But the input 1208 of Task j 1206 is in the "pull" mode, which also requires a source URL from where Task j 1206 can pull the data. When this happens, the Media Gateway (e.g. item 1120 of FIG. 11) may be invoked.

In addition, the media gateway approach can allow more flexible workflow execution flows, e.g. a batch processing mode where one task runs after another task when the previous task has been completed. The completion of one task is not signaled by NBMP but the NBMP workflow allows one exceptional case. When a workflow is in its "running" state, all workflow tasks should be in "running" state with one exception: one or more tasks' "nonessential" flag is set to TRUE. The NBMP feature of workflow manager ability to monitor task status allows the use of an I/O descriptor time-out as the trigger to enable transition of current active state task to idle and activate the next task downstream to active state with the assistance of the media gateway. In this way, the Media Gateway can offload the Workflow Manager by caching and monitoring the data flow. When the batch mode is required, Workflow Manager can make all tasks except the 1st one into "idle" state with their property "nonessential" set to TRUE. After the "timeout" period in the Output Descriptor of the 1st Task, WM can transition the 1st task into "idle" from "running" and invoke the downstream tasks from "idle" to "running" with the "caching-server-url" pointing to the data cached by the Media Gateway. In this way, the 1st task does not need to be in the "running" state and potentially computing resources can be saved.

This would save the computing resources greatly in scenarios where huge media content needs to be transcoded in the off-line mode, for example.

Figure 13:
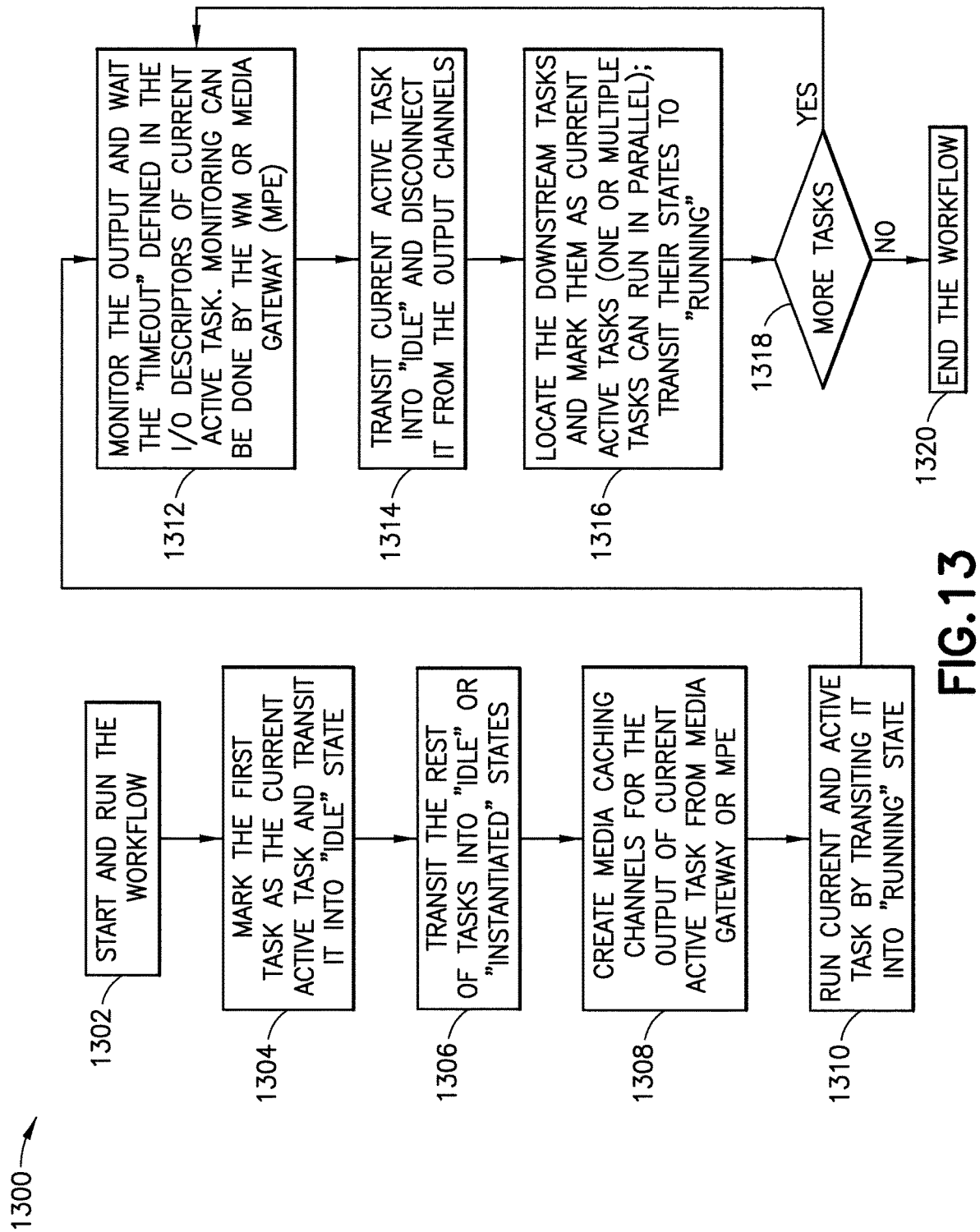
FIG. 13 illustrates an example media I/O gateway assisted batching execution process.

FIG. 13 illustrates an example media I/O gateway assisted batching execution process 1300. At 1302, the workflow is started and initiated to run. At 1304, the first task is marked as the current active task, and the first task is transitioned into an idle state. At 1306, the rest of the tasks are transitioned into idle or instantiated states. At 1308, media caching channels are created for the output of the current active task from the media gateway or MPE. At 1310, the current and active task are run by transitioning them into a "running" state.

At 1312, the process 1300 comprises monitoring the output and waiting for the "timeout" defined in the I/O descriptors of the current active task. The monitoring may be done by the WM (e.g. 308) or Media Gateway (MPE) (e.g. 1006 or 1120). At 1314, the process transits the current active task into "idle" and disconnects the task from the output channels. At 1316, the process locates the downstream tasks and marks them as current active tasks (one or multiple tasks can run in parallel), as well as transits the downstream tasks to "running". At 1318, the process determines whether there are more tasks. If at 1318 there are more tasks (e.g. "yes") the process transitions to 1312. If at 1318 there are no more tasks (e.g. "no") the workflow is ended at 1320.

There are several features, benefits, and technical effects of the examples described herein. These include support of output branching, such as reuse of the same output stream of a task for efficient real-time downstream processing. The examples described herein support "live" synchronous processing and a "video-on-demand" mode for NBMP's step-wise batching processing mode, which saves storage space and time, and provides higher resiliency to connection failure (re-connection does not lose the data). The examples described herein support raw or compressed media with secured network layers (encryption with good data protection).

Figure 14:
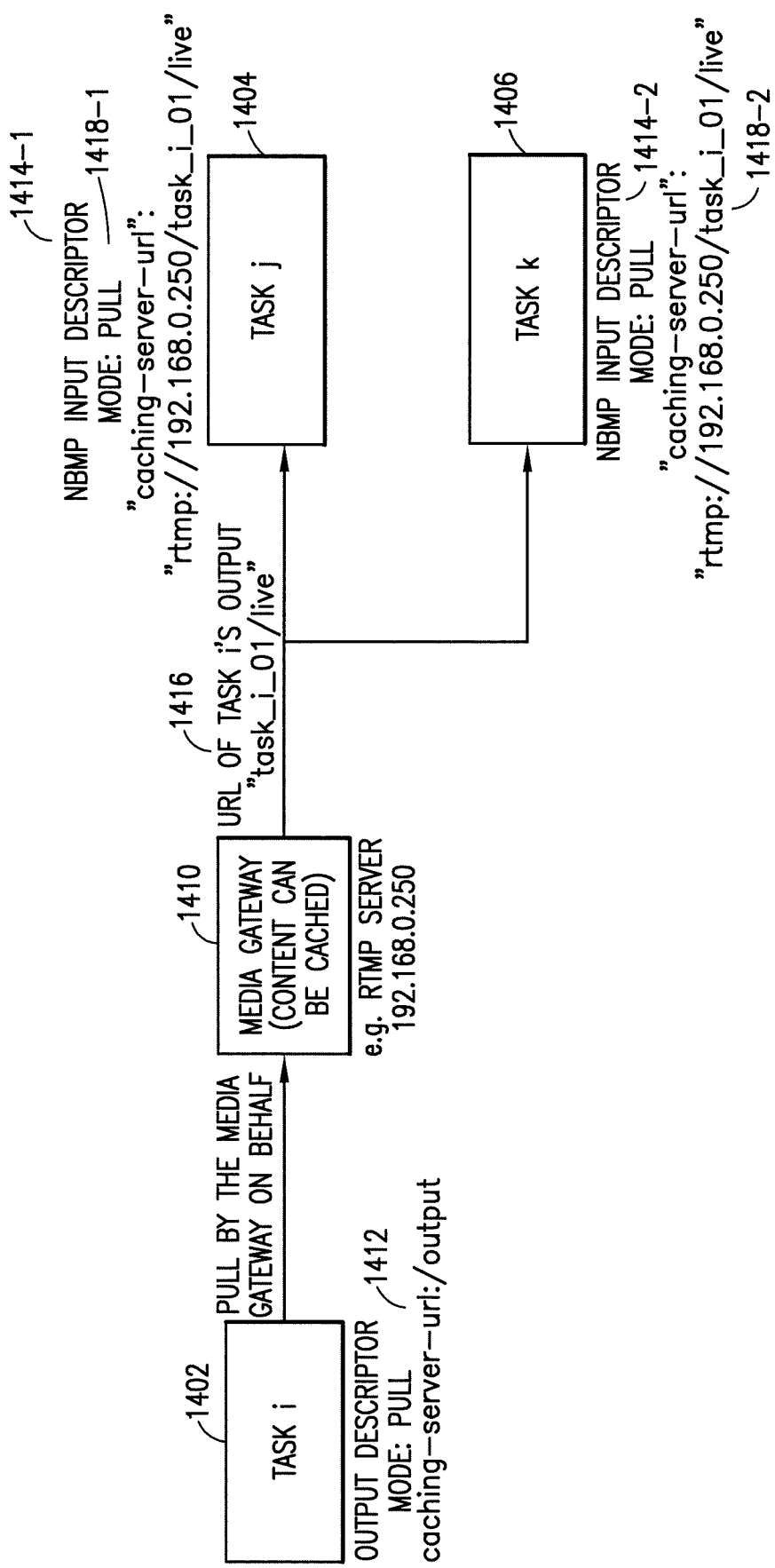
FIG. 14 is an example of Pull→Pull connections.

FIG. 14 shows one workflow to support "pull" mode in its Output Descriptor 1412 linked to tasks working in "pull" mode in their Input Descriptors 1414 (namely 1414-1 and 1414-2). As shown in FIG. 14, the output descriptor 1412 mode of task i 1402 is pull, and the NBMP input descriptor (respectively 1414-1 and 1414-2) of task j 1404 and task k 1406 is pull. The media I/O layer (in the form of Media Gateway 1410) acts as the internal caching server that pulls the content from the "task i" 1402 and provides pulling URL(s) 1418 (namely 1418-1 and 1418-2) for downstream tasks (e.g. "task j" 1404 and "task k" 1406). As shown in FIG. 14, the URL 1416 of the output of task i 1402 is "/task_i_01/live", such that the pulling URL(s) for the downstream tasks is a concatenation of the address of the media gateway 1410 e.g. the RTMP server and the output URL 1416 of task i 1402, the concatenation being "rtmp://192.168.0.250/task_i_01/live".

In one embodiment, the I/O layer 1410 can be implemented as one centralized data middleware or hub that handles multiple input and output channels with the support of different transport protocols. The component can run in the central cloud.

Figure 15:
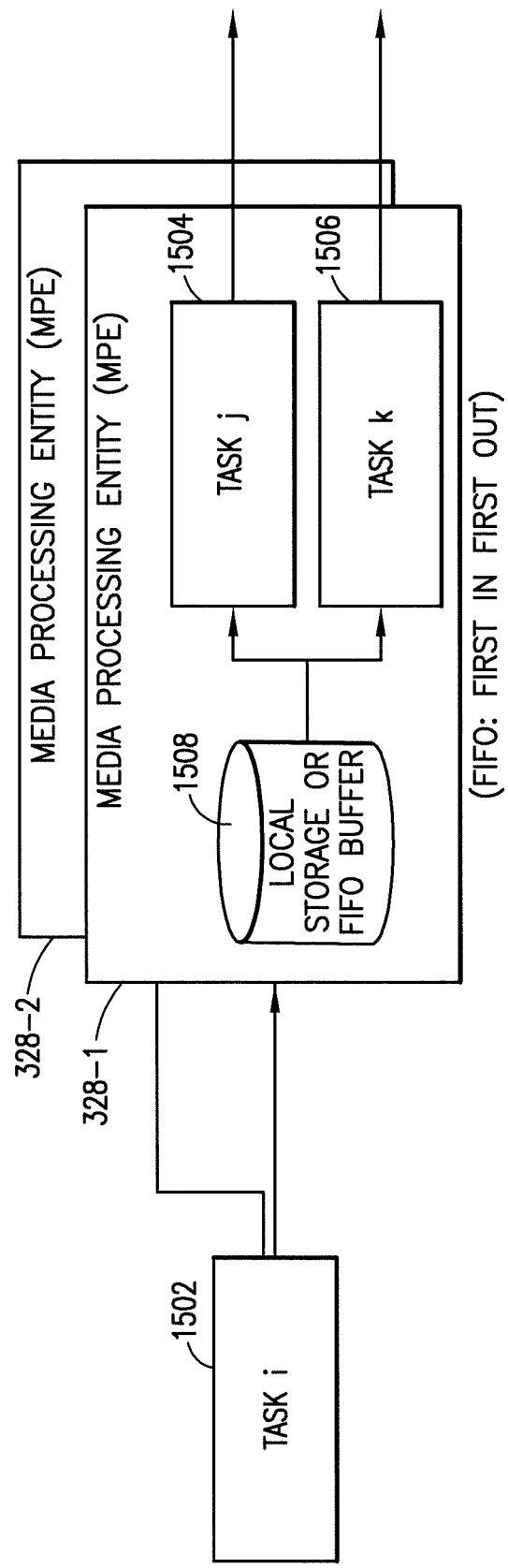
FIG. 15 illustrates the MPE as the media gateway (I/O layer).

With reference to FIG. 15, in one embodiment, the I/O layer can be implemented directly by the media processing entity (MPE) (e.g. MPE 328 of FIG. 3). The entity 328-1 is the environment within which tasks run, such as task j 1504 and task k 1506. The MPE 328 can be deployed to the central cloud, or Edge cloud close to the NBMP Client (e.g. mobile apps) or NBMP Media Source 302 (e.g. cameras). Multiple MPEs (as shown in FIG. 15, MPEs 328-1 and 328-2) can communicate and collaborate to enable fast media data exchange with usually reliable network throughput. As further shown in FIG. 15, MPEs 328-1 and 328-2 receive output from task i 1502, and at least MPE 328-1 comprises a local storage FIFO buffer 1508 acting as the I/O layer 1410 in FIG. 14.

Figure 16:
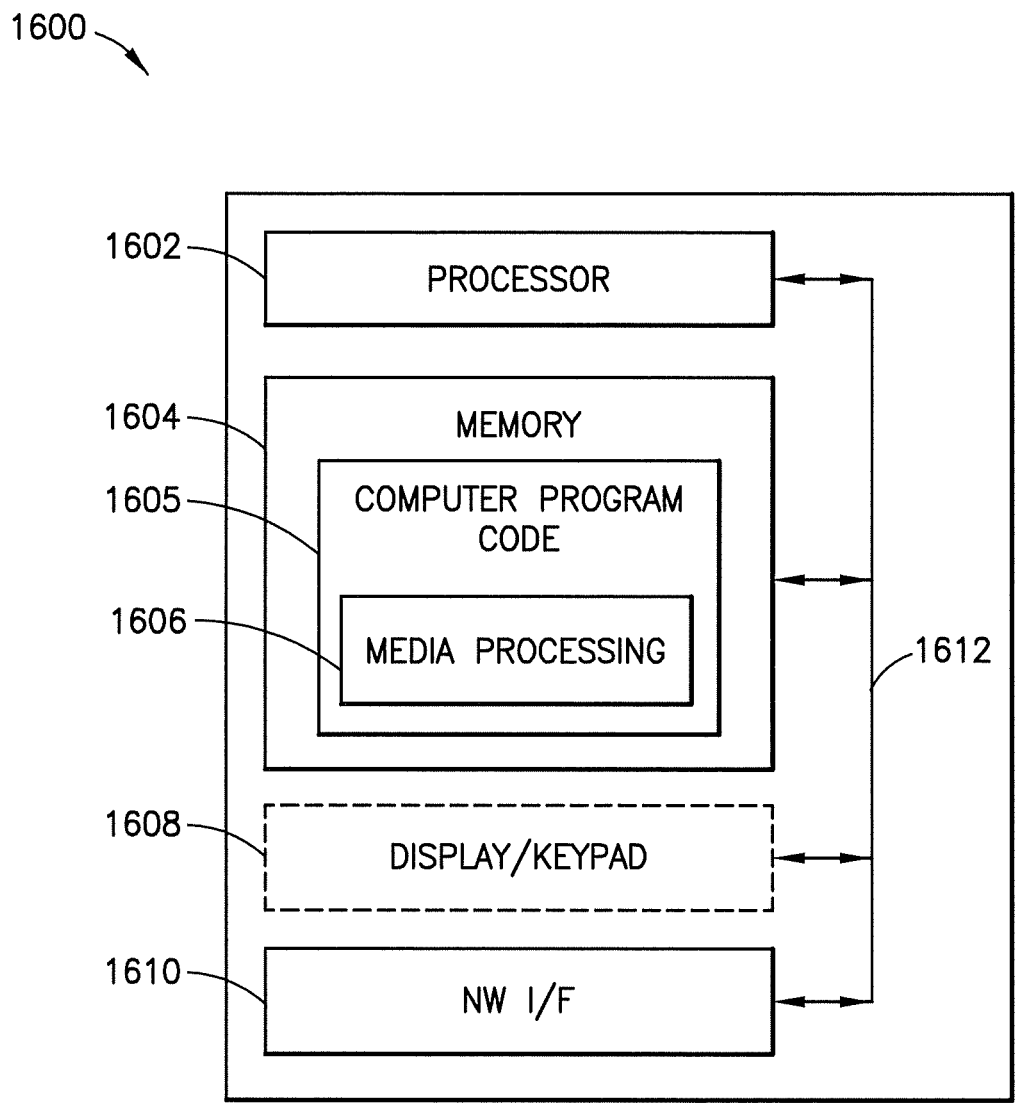
FIG. 16 is an example apparatus to implement flexible upstream/downstream support for network-based media processing pipelines, based on the examples described herein.

FIG. 16 is an apparatus 1600 which may be implemented in hardware, configured to implement flexible upstream/downstream support for network-based media processing pipelines, based on the examples described herein. The apparatus comprises a processor 1602, at least one non-transitory memory 1604 including computer program code 1605, wherein the at least one memory 1604 and the computer program code 1605 are configured to, with the at least one processor 1602, cause the apparatus to implement circuitry, a process, component, module, or function (collectively media processing 1606) to implement flexible upstream/downstream support for network-based media processing pipelines, based on the examples described herein. The apparatus 1600 optionally includes a display 1608 that may be used to display an output of a result of the media processing 1606. The display 1608 may also be configured to receive input such as user input, or be configured to receive input with a keypad. The apparatus 1600 also includes one or more network (NW) interfaces (I/F(s)) 1610. The NW I/F(s) 1610 may be wired and/or wireless and communicate over the Internet/other network(s) via any communication technique. The NW I/F(s) 1610 may comprise one or more transmitters and one or more receivers. The N/W I/F(s) 1610 may comprise standard well-known components such as an amplifier, filter, frequency-converter, (de)modulator, and encoder/decoder circuitry(ies) and one or more antennas.

The apparatus 1600 may be a remote, virtual or cloud apparatus. The memory 1604 may be implemented using any suitable data storage technology, such as semiconductor based memory devices, flash memory, magnetic memory devices and systems, optical memory devices and systems, fixed memory and removable memory. The memory 1604 may comprise a database for storing data. Bus 1612 enables data communication between the various items of apparatus 1600, as shown in FIG. 16. The apparatus 1600 need not comprise each of the features mentioned, or may comprise other features as well. The apparatus may be configured to implement the functionality and/or hardware of the media gateway as described herein, such as the media gateway 1120 shown in FIG. 11, media gateway 1410 shown in FIG. 14 or the MPEs 328-1 and 328-2 shown in FIG. 15.

Figure 17:
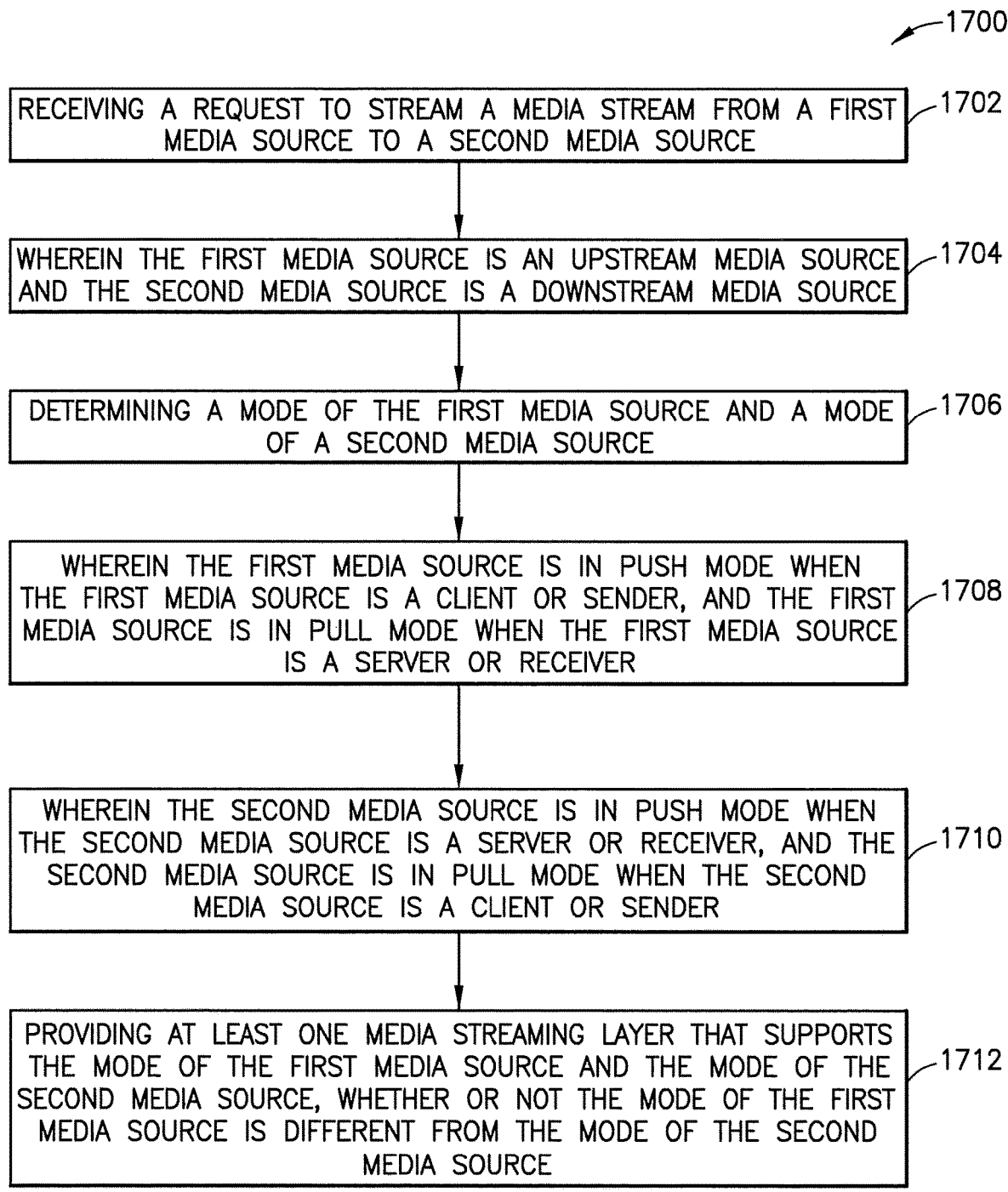
FIG. 17 is an example method to implement flexible upstream/downstream support for network-based media processing pipelines, based on the examples described herein.

FIG. 17 is an example method 1700 to implement flexible upstream/downstream support for network-based media processing pipelines, based on the examples described herein. At 1702, the method includes receiving a request to stream a media stream from a first media source to a second media source. At 1704, the method includes wherein the first media source is an upstream media source and the second media source is a downstream media source. At 1706, the method includes determining a mode of the first media source and a mode of a second media source. At 1708, the method includes wherein the first media source is in push mode when the first media source is a client or sender, and the first media source is in pull mode when the first media source is a server or receiver. At 1710, the method includes wherein the second media source is in push mode when the second media source is a server or receiver, and the second media source is in pull mode when the second media source is a client or sender. At 1712, the method includes providing at least one media streaming layer that supports the mode of the first media source and the mode of the second media source, whether or not the mode of the first media source is different from the mode of the second media source. Method 1700 may be implemented by the media gateway as described herein.

Figure 18:
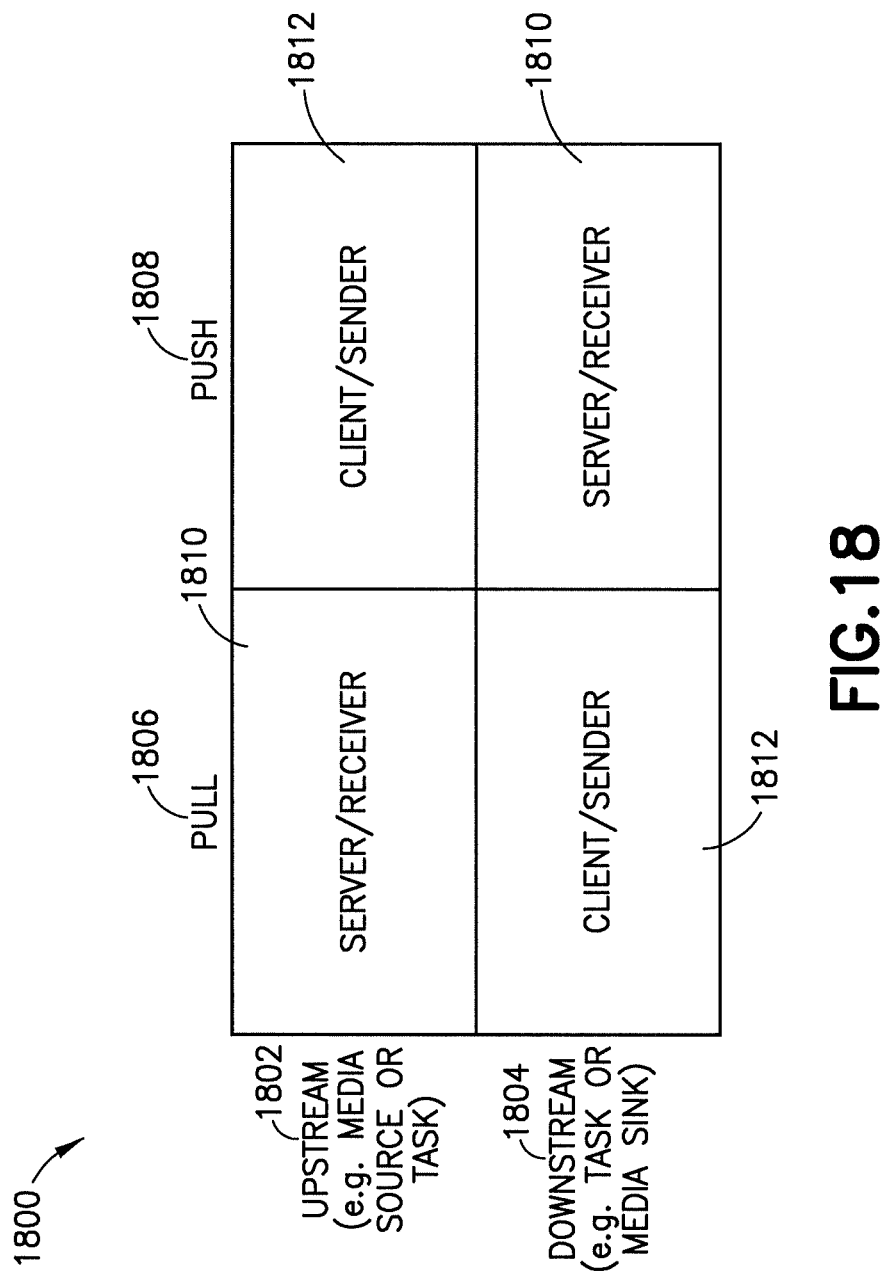
FIG. 18 is an example mapping showing possible roles (server or client) in relation to different I/O modes with respect to media processing flow (upstream and downstream entities), based on the examples described herein.

FIG. 18 is an example mapping 1800 showing possible roles (server or client) in relation to different I/O modes with respect to media processing flow (upstream and downstream entities), based on the examples described herein. As shown in FIG. 18, the upstream entity (e.g. media source or task) 1802 is in pull mode 1806 when acting as a server or receiver 1810, and the upstream entity 1802 is in push mode 1808 when acting as a client or sender 1812. The downstream entity (e.g. task or media sink) 1804 is in pull mode 1806 when acting as a client or sender 1812, and the downstream entity 1804 is in push mode 1808 when acting as a server or receiver 1810.

References to a 'computer', 'processor', etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device such as instructions for a processor, or configuration settings for a fixed-function device, gate array or programmable logic device, etc.

As used herein, the term 'circuitry' may refer to any of the following: (a) hardware circuit implementations, such as implementations in analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This description of 'circuitry' applies to uses of this term in this application. As a further example, as used herein, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

An example apparatus includes at least one processor; and at least one non-transitory memory including computer program code; wherein the at least one memory and the computer program code are configured to, with the at least one processor, cause the apparatus at least to perform: receive a request to stream a media stream from a first media source to a second media source; wherein the first media source is an upstream media source and the second media source is a downstream media source; determine a mode of the first media source and a mode of a second media source; wherein the first media source is in push mode when the first media source is a client or sender, and the first media source is in pull mode when the first media source is a server or receiver; wherein the second media source is in push mode when the second media source is a server or receiver, and the second media source is in pull mode when the second media source is a client or sender; and provide at least one media streaming layer that supports the mode of the first media source and the mode of the second media source, whether or not the mode of the first media source is different from the mode of the second media source.

Other aspects of the apparatus may include the following. The at least one memory and the computer program code may be further configured to, with the at least one processor, cause the apparatus to perform: generate, using the media streaming layer, a media entry point uniform resource locator for a transmission of the media stream to the second media source. The media entry point uniform resource locator may be a caching server uniform resource locator. The at least one memory and the computer program code may be further configured to, with the at least one processor, cause the apparatus to perform: pull content of the media stream from the first media source; and provide a pulling uniform resource locator for the second media source to receive the media stream. The first media source may be a framework for live uplink streaming media sink client of the second media source, and the second media source may be a network-based media processing receiver that ingests the media stream in push mode; or the first media source may be a framework for live uplink streaming media sink server to the second media source, and the second media source may be a network-based media processing client that collects the media stream in pull mode. The first media source may be an upstream task, and the second media source is a downstream task. The second media source may be a network-based media processing entity; the network-based media processing entity may comprise at least one input/output descriptor comprising at least one parameter that identifies a type of the media stream; and the at least one parameter may be one of live, persistent, duration, latency, mode, or priority. The input/output descriptor of the network-based media processing entity may be processed with at least one of a workflow description document or a task description document. The media streaming layer may be part of a media processing entity within which network-based media processing tasks reside and run. The at least one memory and the computer program code may be further configured to, with the at least one processor, cause the apparatus at least to perform: cache the media stream within a local storage first in first out buffer of the media streaming layer. The at least one memory and the computer program code are further configured to, with the at least one processor, cause the apparatus at least to perform: generate an uplink channel between the first media source and the media streaming layer; generate one or more downlink channels between the media streaming layer and the second media source; and configure a layer for transmission of the media stream between the first media source and the second media source over the uplink channel and the one or more downlink channels. The one or more downlink channels may support the push or pull mode of the second media source; and the one or more downlink channels may support a compressed or raw format of the media stream. The push mode of the second media source may correspond to data ingestion, and the pull mode of the second media source may correspond to data collection. The media streaming layer may configure a layer for transmission of the media stream when the first media source is in push mode to use a target uniform resource locator, and the second media source is in pull mode to use a source uniform resource locator. The at least one memory and the computer program code may be further configured to, with the at least one processor, cause the apparatus at least to perform: generate a media caching channel for an output of a current active task; and monitor an output of the current active task, and wait for a timeout given with one or more input/output descriptors of the current active task; wherein the current active task is transitioned to idle in response to the timeout being met. The media streaming layer may be a middleware hub. The media streaming layer may be a cloud entity. Either the first media source or the second media source may be a user equipment. The at least one memory and the computer program code may be further configured to, with the at least one processor, cause the apparatus to perform: determine whether or not there is a connection between the first media source and the second media source; and provide with the at least one media streaming layer a configuration layer for the media stream to be transmitted from the first media source to the second media source whether or not there is a connection between the first media source and the second media source.

An example apparatus includes means for receiving a request to stream a media stream from a first media source to a second media source; wherein the first media source is an upstream media source and the second media source is a downstream media source; means for determining a mode of the first media source and a mode of a second media source; wherein the first media source is in push mode when the first media source is a client or sender, and the first media source is in pull mode when the first media source is a server or receiver; wherein the second media source is in push mode when the second media source is a server or receiver, and the second media source is in pull mode when the second media source is a client or sender; and means for providing at least one media streaming layer that supports the mode of the first media source and the mode of the second media source, whether or not the mode of the first media source is different from the mode of the second media source.

The apparatus may further include means for generating, using the media streaming layer, a media entry point uniform resource locator for a transmission of the media stream to the second media source.

The apparatus may further include wherein the media entry point uniform resource locator is a caching server uniform resource locator.

The apparatus may further include: means for pulling content of the media stream from the first media source; and means for providing a pulling uniform resource locator for the second media source to receive the media stream.

The apparatus may further include wherein: the first media source is a framework for live uplink streaming media sink client of the second media source, and the second media source is a network-based media processing receiver that ingests the media stream in push mode; or the first media source is a framework for live uplink streaming media sink server to the second media source, and the second media source is a network-based media processing client that collects the media stream in pull mode.

The apparatus may further include wherein the first media source is an upstream task, and the second media source is a downstream task.

The apparatus may further include wherein: the second media source is a network-based media processing entity; the network-based media processing entity comprises at least one input/output descriptor comprising at least one parameter that identifies a type of the media stream; and the at least one parameter is one of live, persistent, duration, latency, mode, or priority.

The apparatus may further include wherein the input/output descriptor of the network-based media processing entity is processed with at least one of a workflow description document or a task description document.

The apparatus may further include wherein the media streaming layer is part of a media processing entity within which network-based media processing tasks reside and run.

The apparatus may further include: means for caching the media stream within a local storage first in first out buffer of the media streaming layer.

The apparatus may further include: means for generating an uplink channel between the first media source and the media streaming layer; means for generating one or more downlink channels between the media streaming layer and the second media source; and means for configuring a layer for transmission of the media stream between the first media source and the second media source over the uplink channel and the one or more downlink channels.

The apparatus may further include wherein: the one or more downlink channels support the push or pull mode of the second media source; and the one or more downlink channels support a compressed or raw format of the media stream.

The apparatus may further include wherein: the push mode of the second media source corresponds to data ingestion, and the pull mode of the second media source corresponds to data collection.

The apparatus may further include wherein the media streaming layer configures a layer for transmission of the media stream when the first media source is in push mode to use a target uniform resource locator, and the second media source is in pull mode to use a source uniform resource locator.

The apparatus may further include: means for generating a media caching channel for an output of a current active task; and means for monitoring an output of the current active task, and wait for a timeout given with one or more input/output descriptors of the current active task; wherein the current active task is transitioned to idle in response to the timeout being met.

The apparatus may further include wherein the media streaming layer is a middleware hub.

The apparatus may further include wherein the media streaming layer is a cloud entity.

The apparatus may further include wherein either the first media source or the second media source is a user equipment.

The apparatus may further include: means for determining whether or not there is a connection between the first media source and the second media source; and means for providing with the at least one media streaming layer a configuration layer for the media stream to be transmitted from the first media source to the second media source whether or not there is a connection between the first media source and the second media source.

An example method includes receiving a request to stream a media stream from a first media source to a second media source; wherein the first media source is an upstream media source and the second media source is a downstream media source; determining a mode of the first media source and a mode of a second media source; wherein the first media source is in push mode when the first media source is a client or sender, and the first media source is in pull mode when the first media source is a server or receiver; wherein the second media source is in push mode when the second media source is a server or receiver, and the second media source is in pull mode when the second media source is a client or sender; and providing at least one media streaming layer that supports the mode of the first media source and the mode of the second media source, whether or not the mode of the first media source is different from the mode of the second media source.

An example non-transitory program storage device readable by a machine, tangibly embodying a program of instructions executable by the machine for performing operations is provided, the operations comprising: receiving a request to stream a media stream from a first media source to a second media source; wherein the first media source is an upstream media source and the second media source is a downstream media source; determining a mode of the first media source and a mode of a second media source; wherein the first media source is in push mode when the first media source is a client or sender, and the first media source is in pull mode when the first media source is a server or receiver; wherein the second media source is in push mode when the second media source is a server or receiver, and the second media source is in pull mode when the second media source is a client or sender; and providing at least one media streaming layer that supports the mode of the first media source and the mode of the second media source, whether or not the mode of the first media source is different from the mode of the second media source.

An example apparatus includes means for processing media comprising data over a network, the processing having an input and an output; means for determining a value of a mode parameter to process the data, the value of the mode parameter set to either push or pull; wherein the mode parameter is added to an input descriptor or an output descriptor, and the mode parameter functions with a protocol parameter together in the input descriptor and the output descriptor; means for determining, for the input, when the value of the mode parameter is set to push, that the data is pushed to the input, otherwise when the value of the mode parameter is set to pull, that the data is pulled with the input; and means for determining, for the output, when the value of the mode parameter is set to push, that the data is pushed from the output, otherwise when the value of the mode parameter is set to pull, that the data is pulled from the output.

The apparatus may further include wherein the input descriptor and the output descriptor define a caching server uniform resource locator parameter configured to indicate a uniform resource locator of a server where the media is sent or retrieved.

The apparatus may further include wherein in response to the caching server uniform resource locator parameter being missing for a workflow, a workflow manager assigns destination information of a media processing entity to a media source, such that a media sink ingests the media.

The apparatus may further include wherein: the media is processed as a media stream with a first media source and a second media source; the first media source is a framework for live uplink streaming media sink client of the second media source, and the second media source is a network based media processing receiver configured to ingest the media stream in push mode; or the first media source is a framework for live uplink streaming media sink server to the second media source, and the second media source is a network based media processing client configured to collect the media stream in pull mode.

The apparatus may further include wherein the media is processed from a first media source to a second media source, where the first media source comprises an upstream task, and the second media source comprises a downstream task.

The apparatus may further include wherein the media is processed as a media stream with a network based media processing entity, the network based media processing entity comprising at least one input and output descriptor comprising at least one parameter configured to identify a type of the media stream.

The apparatus may further include wherein at least one parameter describing the media comprises a live indication.

The apparatus may further include wherein at least one parameter describing the media comprises at least one of: duration, the duration describing availability of the data from a moment the data appears when the data is pulled, where a duration value of 0 indicates that a stream is live and a continuous stream ready to be pulled or continuously pushed; persistence, the persistence comprising: a persistency capability configured to indicate whether storage provided with media processing is automatically persistent, where a default value of the persistency capability comprises true; a secure persistency configured to indicate whether a persistent data transfer is secure, where a default value of the secure persistency comprises false; or a persistence storage uniform resource locator defining a location of one or more items of storage configured to be used to transfer media processing entity data and state or task data and state; or latency, where the latency defines a minimum interval between two fetches or pushes accepted with input of the input descriptor or output of the output descriptor.

The apparatus may further include wherein a workflow description for processing the media is passed from a network based media processing source to a workflow manager, wherein the workflow description describes input data and output data, functions used to process the media during a network based media processing workflow, and other requirements for the workflow, wherein the network based media processing workflow is described using the input descriptor and the output descriptor.

An example apparatus includes means for defining, with network based media processing, an input descriptor and an output descriptor; wherein the input descriptor and the output descriptor are used for ingesting or egesting media and metadata into network based media processing workflow pipelines; wherein the input descriptor and the output descriptor are used for delivering outcome data from the pipelines to network based media processing media sink targets and internal inputs and outputs between upstream and downstream tasks; and means for processing media comprising data over a network, using at least the input descriptor and the output descriptor.

The apparatus may further include wherein the input descriptor and the output descriptor define essential accessibility information including media content formats, types, and protocols, and the media and metadata are available through a caching server uniform resource locator defined in the input descriptor and the output descriptor.

The apparatus may further include wherein ingesting or egesting of the media is performed with at least one of a media source, a media sink, a media processing entity, or a plurality of tasks, and where there is interworking among the tasks.

The apparatus may further include wherein the media and metadata are provided from various sources and consumed with various sinks.

The apparatus may further include wherein a network based media processing standard is agnostic to transportation protocols and networks.

The apparatus may further include wherein: a source task pushes outcome data to downstream components, the outcome data being the media or metadata and the downstream components being at least one task or a media sink; or the at least one task pulls data from at least one upstream element, the at least one upstream element being one of the at least one task or a media source.

The apparatus may further include wherein: a source task initiates transfer of the data, in response to a value of a mode parameter being set to push; and a downstream task initiates data transfer in a media processing pipeline, in response a value of the mode parameter being set to pull.

The apparatus may further include means for defining a network based media processing input and output caching server uniform resource locator parameter configured to identify at least one of: endpoints for push type input, where an upstream system pushes the data to at least one task; or source internet protocol addresses used for upstream data processing for a pull type input, where a task pulls data from the upstream system.

The apparatus may further include wherein the endpoints comprise Internet protocol addresses.

The apparatus may further include wherein the upstream system comprises at least one task or a media source.

The apparatus may further include wherein at least one task is configured to support one or multiple input types for different formats and protocols, including hypertext transfer protocol live streaming pull input and real time messaging protocol push input.

An example apparatus includes means for processing video on demand data for a first task in a push mode, wherein the first task is in an idle or running state; and means for processing the video on demand data for a second task in a pull mode, wherein the second task is in an idle or running state.

The apparatus may further include wherein network based media processing workflows have no constraints on execution modes when the first task and the second task run in batch processing.

The apparatus may further include wherein the second task is in a running state when a first task is either done, in the idle state, or in the running state.

The apparatus may further include wherein a streaming mode comprises the first task and the second task being in the running state.

The apparatus may further include wherein in the streaming mode, the data become available to the first task or the second task as soon as possible, constrained with data transfer throughput and latency.

The apparatus may further include wherein a default mode comprises a network based media processing workflow assuming common states of tasks of the network based media processing workflow, and the default mode supports live or real time media processing for fast media processing and delivery.

The apparatus may further include wherein a workflow in a running state assumes tasks are also in the running state.

The apparatus may further include wherein network based media processing comprises an alternative mode configured to allow less essential tasks to be in an idle mode, wherein when a workflow is running in the alternative mode, the workflow adds extra requirements to a workflow manager so that the data remains available when task states are changed from one state to another.

The apparatus may further include wherein a workflow manager schedules tasks in various conditions and instantiates uniform resource locators for media or metadata for data transfer, and provides support for both a batch processing mode and a streaming mode.

The apparatus may further include wherein the streaming mode is configured to be used for use cases that have low latency and real time instantaneous processing requirements so that at least a portion of the data does not need to be stored or cached, as the data flows through tasks in a sequence of relatively small fragment sizes.

An example method includes processing media comprising data over a network, the processing having an input and an output; determining a value of a mode parameter to process the data, the value of the mode parameter set to either push or pull; wherein the mode parameter is added to an input descriptor or an output descriptor, and the mode parameter functions with a protocol parameter together in the input descriptor and the output descriptor; determining, for the input, when the value of the mode parameter is set to push, that the data is pushed to the input, otherwise when the value of the mode parameter is set to pull, that the data is pulled with the input; and determining, for the output, when the value of the mode parameter is set to push, that the data is pushed from the output, otherwise when the value of the mode parameter is set to pull, that the data is pulled from the output.

An example method includes defining, with network based media processing, an input descriptor and an output descriptor; wherein the input descriptor and the output descriptor are used for ingesting or egesting media and metadata into network based media processing workflow pipelines; wherein the input descriptor and the output descriptor are used for delivering outcome data from the pipelines to network based media processing media sink targets and internal inputs and outputs between upstream and downstream tasks; and processing media comprising data over a network, using at least the input descriptor and the output descriptor.

An example method includes processing video on demand data for a first task in a push mode, wherein the first task is in an idle or running state; and processing the video on demand data for a second task in a pull mode, wherein the second task is in an idle or running state.

An example apparatus includes at least one processor; and at least one memory including computer program code; wherein the at least one memory and the computer program code are configured to, with the at least one processor, cause the apparatus at least to: process media comprising data over a network, the processing having an input and an output; determine a value of a mode parameter to process the data, the value of the mode parameter set to either push or pull; wherein the mode parameter is added to an input descriptor or an output descriptor, and the mode parameter functions with a protocol parameter together in the input descriptor and the output descriptor; determine, for the input, when the value of the mode parameter is set to push, that the data is pushed to the input, otherwise when the value of the mode parameter is set to pull, that the data is pulled with the input; and determine, for the output, when the value of the mode parameter is set to push, that the data is pushed from the output, otherwise when the value of the mode parameter is set to pull, that the data is pulled from the output.

The apparatus may further include wherein the input descriptor and the output descriptor define a caching server uniform resource locator parameter configured to indicate a uniform resource locator of a server where the media is sent or retrieved.

The apparatus may further include wherein in response to the caching server uniform resource locator parameter being missing for a workflow, a workflow manager assigns destination information of a media processing entity to a media source, such that a media sink ingests the media.

The apparatus may further include wherein: the media is processed as a media stream with a first media source and a second media source; the first media source is a framework for live uplink streaming media sink client of the second media source, and the second media source is a network based media processing receiver configured to ingest the media stream in push mode; or the first media source is a framework for live uplink streaming media sink server to the second media source, and the second media source is a network based media processing client configured to collect the media stream in pull mode.

The apparatus may further include wherein the media is processed from a first media source to a second media source, where the first media source comprises an upstream task, and the second media source comprises a downstream task.

The apparatus may further include wherein the media is processed as a media stream with a network based media processing entity, the network based media processing entity comprising at least one input and output descriptor comprising at least one parameter configured to identify a type of the media stream.

The apparatus may further include wherein at least one parameter describing the media comprises a live indication.

The apparatus may further include wherein at least one parameter describing the media comprises at least one of: duration, the duration describing availability of the data from a moment the data appears when the data is pulled, where a duration value of 0 indicates that a stream is live and a continuous stream ready to be pulled or continuously pushed; persistence, the persistence comprising: a persistency capability configured to indicate whether storage provided with media processing is automatically persistent, where a default value of the persistency capability comprises true; a secure persistency configured to indicate whether a persistent data transfer is secure, where a default value of the secure persistency comprises false; or a persistence storage uniform resource locator defining a location of one or more items of storage configured to be used to transfer media processing entity data and state or task data and state; or latency, where the latency defines a minimum interval between two fetches or pushes accepted with input of the input descriptor or output of the output descriptor.

The apparatus may further include wherein a workflow description for processing the media is passed from a network based media processing source to a workflow manager, wherein the workflow description describes input data and output data, functions used to process the media during a network based media processing workflow, and other requirements for the workflow, wherein the network based media processing workflow is described using the input descriptor and the output descriptor.

An example apparatus includes at least one processor; and at least one memory including computer program code; wherein the at least one memory and the computer program code are configured to, with the at least one processor, cause the apparatus at least to: define, with network based media processing, an input descriptor and an output descriptor; wherein the input descriptor and the output descriptor are used for ingesting or egesting media and metadata into network based media processing workflow pipelines; wherein the input descriptor and the output descriptor are used for delivering outcome data from the pipelines to network based media processing media sink targets and internal inputs and outputs between upstream and downstream tasks; and process media comprising data over a network, using at least the input descriptor and the output descriptor.

The apparatus may further include wherein the input descriptor and the output descriptor define essential accessibility information including media content formats, types, and protocols, and the media and metadata are available through a caching server uniform resource locator defined in the input descriptor and the output descriptor.

The apparatus may further include wherein ingesting or egesting of the media is performed with at least one of a media source, a media sink, a media processing entity, or a plurality of tasks, and where there is interworking among the tasks.

The apparatus may further include wherein the media and metadata are provided from various sources and consumed with various sinks.

The apparatus may further include wherein a network based media processing standard is agnostic to transportation protocols and networks.

The apparatus may further include wherein: a source task pushes outcome data to downstream components, the outcome data being the media or metadata and the downstream components being at least one task or a media sink; or the at least one task pulls data from at least one upstream element, the at least one upstream element being one of the at least one task or a media source.

The apparatus may further include wherein: a source task initiates transfer of the data, in response to a value of a mode parameter being set to push; and a downstream task initiates data transfer in a media processing pipeline, in response a value of the mode parameter being set to pull.

The apparatus may further include wherein the at least one memory and the computer program code are further configured to, with the at least one processor, cause the apparatus at least to: define a network based media processing input and output caching server uniform resource locator parameter configured to identify at least one of: endpoints for push type input, where an upstream system pushes the data to at least one task; or source internet protocol addresses used for upstream data processing for a pull type input, where a task pulls data from the upstream system.

The apparatus may further include wherein the endpoints comprise internet protocol addresses.

The apparatus may further include wherein the upstream system comprises at least one task or a media source.

The apparatus may further include wherein at least one task is configured to support one or multiple input types for different formats and protocols, including hypertext transfer protocol live streaming pull input and real time messaging protocol push input.

An example apparatus includes at least one processor; and at least one memory including computer program code; wherein the at least one memory and the computer program code are configured to, with the at least one processor, cause the apparatus at least to: process video on demand data for a first task in a push mode, wherein the first task is in an idle or running state; and process the video on demand data for a second task in a pull mode, wherein the second task is in an idle or running state.

The apparatus may further include wherein network based media processing workflows have no constraints on execution modes when the first task and the second task run in batch processing.

The apparatus may further include wherein the second task is in a running state when a first task is either done, in the idle state, or in the running state.

The apparatus may further include wherein a streaming mode comprises the first task and the second task being in the running state.

The apparatus may further include wherein in the streaming mode, the data become available to the first task or the second task as soon as possible, constrained with data transfer throughput and latency.

The apparatus may further include wherein a default mode comprises a network based media processing workflow assuming common states of tasks of the network based media processing workflow, and the default mode supports live or real time media processing for fast media processing and delivery.

The apparatus may further include wherein a workflow in a running state assumes tasks are also in the running state.

The apparatus may further include wherein network based media processing comprises an alternative mode configured to allow less essential tasks to be in an idle mode, wherein when a workflow is running in the alternative mode, the workflow adds extra requirements to a workflow manager so that the data remains available when task states are changed from one state to another.

The apparatus may further include wherein a workflow manager schedules tasks in various conditions and instantiates uniform resource locators for media or metadata for data transfer, and provides support for both a batch processing mode and a streaming mode.

The apparatus may further include wherein the streaming mode is configured to be used for use cases that have low latency and real time instantaneous processing requirements so that at least a portion of the data does not need to be stored or cached, as the data flows through tasks in a sequence of relatively small fragment sizes.

It should be understood that the foregoing description is only illustrative. Various alternatives and modifications may be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

The following acronyms and abbreviations that may be found in the specification and/or the drawing figures are defined as follows:

3GPP third generation partnership project
addr address
API application programming interface
ASIC application-specific integrated circuit
CPU central processing unit DAG directional/directed acyclic graph
DASH dynamic adaptive streaming over HTTP
EA external application
ETSI European telecommunications standards institute
F-C FLUS control interface
F-U FLUS user interface
FDD function description document
FDIS final draft international standard
FIFO first in first out
FLUS framework for live uplink streaming
FPGA field-programmable gate array
F-RC FLUS remote control interface
FW firewall
F# FLUS interface
GPU graphics processing unit
HLS HTTP live streaming
HTTP hypertext transfer protocol
IEC international electrotechnical commission
I/F interface
IMS IP multimedia subsystem
I/O input/output
IP internet protocol
ISO international organization for standardization
MEC multi-access edge computing
MPE media processing entity or application
MPEG moving picture experts group
MPEG-I MPEG immersive
MTSI multimedia telephony service for IMS
NAT network address translation
NBMP network-based media processing
NW network
N# NBMP interface
p2p peer to peer
QoS quality of service
RTCP real-time transport control protocol
RTMP real-time messaging protocol
RTP real-time transport protocol
RTSP real time streaming protocol
SA system architecture
SA4 system architecture working group 4—multimedia codecs, systems and services
TCP transmission control protocol
TDD task description document
TR technical report
TS technical specification
UA user equipment (UE) application
UDP user datagram protocol
UE user equipment
URL uniform resource locator
VDD video on demand
WDD workflow description document
WM workflow manager/management

What is claimed is:

1. A method comprising:
processing media comprising data over a network, the processing having an input and an output;
determining a value of a mode parameter to process the data, the value of the mode parameter set to either push or pull;
wherein the mode parameter is added to an input descriptor or an output descriptor, and the mode parameter functions with a protocol parameter together in the input descriptor and the output descriptor;
determining, for the input, when the value of the mode parameter is set to push, that the data is pushed to the input, otherwise when the value of the mode parameter is set to pull, that the data is pulled by the input; and
determining, for the output, when the value of the mode parameter is set to push, that the data is pushed from the output, otherwise when the value of the mode parameter is set to pull, that the data is pulled from the output;
wherein the input descriptor and the output descriptor at least partially define a caching server uniform resource locator parameter configured to indicate a uniform resource locator of a server where the media is sent or retrieved;
wherein in response to the caching server uniform resource locator parameter being missing for a workflow, a workflow manager is configured to assign destination information of a media processing entity to a media source, wherein a media sink is configured to ingest the media.

2. The method of claim 1, wherein the input descriptor or the output descriptor comprises a duration parameter that indicates a duration of availability of the data, the duration comprising a time in milliseconds from a moment the data appears when the data is pulled to an end of the duration.

3. The method of claim 2, wherein the duration parameter comprises a value that indicates that a stream is live and a continuous stream ready to be pulled or continuously pushed.

4. The method of claim 3, wherein the value of the duration parameter that indicates that the stream is live and a continuous stream ready to be pulled or continuously pushed is 0.

5. The method of claim 1, wherein:
the media is processed as a media stream with a first media source and a second media source;
the first media source is a framework for live uplink streaming media sink client of the second media source, and the second media source is a network based media processing receiver configured to ingest the media stream in push mode; or
the first media source is a framework for live uplink streaming media sink server to the second media source, and the second media source is a network based media processing client configured to collect the media stream in pull mode.

6. The method of claim 1, wherein:
the media is processed from a first media source to a second media source, where the first media source comprises an upstream task, and the second media source comprises a downstream task; or
the media is processed as a media stream with a network based media processing entity, the network based media processing entity comprising at least one input and output descriptor comprising at least one identification parameter configured to identify a type of the media stream.

7. The method of claim 1, wherein the at least one description parameter describing the media comprises a latency parameter, where the latency parameter defines an interval between two fetches or pushes accepted with input of the input descriptor or output of the output descriptor.

8. The method of claim 1, further comprising determining a persistence parameter, the persistence parameter comprising at least one of:
a persistency capability parameter configured to indicate whether storage provided with media processing is automatically persistent;
a secure persistency parameter configured to indicate whether a transfer of media processing entity data and state to another media processing entity is secure; or a persistence storage uniform resource locator parameter comprising at least one uniform resource locator, the at least one uniform resource locator defining a location of persistent storage.

9. The method of claim 8, wherein a default value of the persistency capability parameter comprises true, and wherein a default value of the secure persistency parameter comprises false.

10. The method of claim 1, wherein a workflow description for processing the media is passed from a network based media processing source to a workflow manager, wherein the workflow description describes input data and output data, and functions used to process the media during a network based media processing workflow, wherein the network based media processing workflow is described using the input descriptor and the output descriptor.

11. An apparatus comprising:
at least one processor; and
at least one non-transitory memory storing instructions that, when executed by the at least one processor, cause the apparatus at least to:
process media comprising data over a network, the processing having an input and an output;
determine a value of a mode parameter to process the data, the value of the mode parameter set to either push or pull;
wherein the mode parameter is added to an input descriptor or an output descriptor, and the mode parameter functions with a protocol parameter together in the input descriptor and the output descriptor;
determine, for the input, when the value of the mode parameter is set to push, that the data is pushed to the input, otherwise when the value of the mode parameter is set to pull, that the data is pulled by the input; and
determine, for the output, when the value of the mode parameter is set to push, that the data is pushed from the output, otherwise when the value of the mode parameter is set to pull, that the data is pulled from the output;
wherein the input descriptor and the output descriptor at least partially define a caching server uniform resource locator parameter configured to indicate a uniform resource locator of a server where the media is sent or retrieved;
wherein in response to the caching server uniform resource locator parameter being missing for a workflow, a workflow manager is configured to assign destination information of a media processing entity to a media source, wherein a media sink is configured to ingest the media.

12. The apparatus of claim 11, wherein the input descriptor or the output descriptor comprises a duration parameter that indicates a duration of availability of the data, the duration comprising a time in milliseconds from a moment the data appears when the data is pulled to an end of the duration.

13. The apparatus of claim 12, wherein the duration parameter comprises a value that indicates that a stream is live and a continuous stream ready to be pulled or continuously pushed.

14. The apparatus of claim 13, wherein the value of the duration parameter that indicates that the stream is live and a continuous stream ready to be pulled or continuously pushed is 0.

15. The apparatus of claim 11, wherein:
the media is processed as a media stream with a first media source and a second media source;
the first media source is a framework for live uplink streaming media sink client of the second media source, and the second media source is a network based media processing receiver configured to ingest the media stream in push mode; or
the first media source is a framework for live uplink streaming media sink server to the second media source, and the second media source is a network based media processing client configured to collect the media stream in pull mode.

16. The apparatus of claim 11, wherein:
the media is processed from a first media source to a second media source, where the first media source comprises an upstream task, and the second media source comprises a downstream task; or
the media is processed as a media stream with a network based media processing entity, the network based media processing entity comprising at least one input and output descriptor comprising at least one identification parameter configured to identify a type of the media stream.

17. The apparatus of claim 11, wherein the at least one description parameter describing the media comprises a latency parameter, where the latency parameter defines an interval between two fetches or pushes accepted with input of the input descriptor or output of the output descriptor.

18. The apparatus of claim 11, wherein the instructions, when executed by the at least one processor, cause the apparatus at least to determine a persistence parameter, the persistence parameter comprising at least one of:
a persistency capability parameter configured to indicate whether storage provided with media processing is automatically persistent;
a secure persistency parameter configured to indicate whether a transfer of media processing entity data and state to another media processing entity is secure; or
a persistence storage uniform resource locator parameter comprising at least one uniform resource locator, the at least one uniform resource locator defining a location of persistent storage.

19. The apparatus of claim 18, wherein a default value of the persistency capability parameter comprises true, and wherein a default value of the secure persistency parameter comprises false.

20. The apparatus of claim 11, wherein a workflow description for processing the media is passed from a network based media processing source to a workflow manager, wherein the workflow description describes input data and output data, and functions used to process the media during a network based media processing workflow, wherein the network based media processing workflow is described using the input descriptor and the output descriptor.

21. A non-transitory program storage device readable by a machine, tangibly embodying a program of instructions executable with the machine for performing operations, the operations comprising:
processing media comprising data over a network, the processing having an input and an output;
determining a value of a mode parameter to process the data, the value of the mode parameter set to either push or pull;
wherein the mode parameter is added to an input descriptor or an output descriptor, and the mode parameter functions with a protocol parameter together in the input descriptor and the output descriptor;

determining, for the input, when the value of the mode parameter is set to push, that the data is pushed to the input, otherwise when the value of the mode parameter is set to pull, that the data is pulled by the input; and determining, for the output, when the value of the mode parameter is set to push, that the data is pushed from the output, otherwise when the value of the mode parameter is set to pull, that the data is pulled from the output;

wherein the input descriptor and the output descriptor at least partially define a caching server uniform resource locator parameter configured to indicate a uniform resource locator of a server where the media is sent or retrieved;

wherein in response to the caching server uniform resource locator parameter being missing for a workflow, a workflow manager is configured to assign destination information of a media processing entity to a media source, wherein a media sink is configured to ingest the media.

22. The non-transitory program storage device of claim 21, wherein the input descriptor or the output descriptor comprises a duration parameter that indicates a duration of availability of the data, the duration comprising a time in milliseconds from a moment the data appears when the data is pulled to an end of the duration.

23. The non-transitory program storage device of claim 22, wherein the duration parameter comprises a value that indicates that a stream is live and a continuous stream ready to be pulled or continuously pushed.

24. The non-transitory program storage device of claim 23, wherein the value of the duration parameter that indicates that the stream is live and a continuous stream ready to be pulled or continuously pushed is 0.

25. The non-transitory program storage device of claim 21, wherein:
the media is processed as a media stream with a first media source and a second media source;
the first media source is a framework for live uplink streaming media sink client of the second media source, and the second media source is a network based media processing receiver configured to ingest the media stream in push mode; or
the first media source is a framework for live uplink streaming media sink server to the second media source, and the second media source is a network based media processing client configured to collect the media stream in pull mode.

26. The non-transitory program storage device of claim 21, wherein:
the media is processed from a first media source to a second media source, where the first media source comprises an upstream task, and the second media source comprises a downstream task; or
the media is processed as a media stream with a network based media processing entity, the network based media processing entity comprising at least one input and output descriptor comprising at least one identification parameter configured to identify a type of the media stream.

27. The non-transitory program storage device of claim 21, wherein the at least one description parameter describing the media comprises a latency parameter, where the latency parameter defines an interval between two fetches or pushes accepted with input of the input descriptor or output of the output descriptor.

28. The non-transitory program storage device of claim 21, the operations further comprising determining a persistence parameter, the persistence parameter comprising at least one of:
a persistency capability parameter configured to indicate whether storage provided with media processing is automatically persistent;
a secure persistency parameter configured to indicate whether a transfer of media processing entity data and state to another media processing entity is secure;
or a persistence storage uniform resource locator parameter comprising at least one uniform resource locator, the at least one uniform resource locator defining a location of one or more items of storage configured to be used to transfer media processing entity data and state or task data and state.

29. The non-transitory program storage device of claim 28, wherein a default value of the persistency capability parameter comprises true, and wherein a default value of the secure persistency parameter comprises false.

30. The non-transitory program storage device of claim 21, wherein a workflow description for processing the media is passed from a network based media processing source to a workflow manager, wherein the workflow description describes input data and output data, and functions used to process the media during a network based media processing workflow, wherein the network based media processing workflow is described using the input descriptor and the output descriptor.

* * * * *